(12) United States Patent
Tan et al.

(10) Patent No.: US 11,989,233 B2
(45) Date of Patent: May 21, 2024

(54) TRANSFORMATION FOR FAST INNER PRODUCT SEARCH ON GRAPH

(71) Applicant: Baidu USA, LLC, Sunnyvale, CA (US)

(72) Inventors: Shulong Tan, Santa Clara, CA (US); Zhixin Zhou, Los Angeles, CA (US); Zhaozhuo Xu, Houston, TX (US); Ping Li, Bellevue, WA (US)

(73) Assignee: Baidu USA LLC, Sunnyvale, CA (US)

( * ) Notice: Subject to any disclaimer, the term of this patent is extended or adjusted under 35 U.S.C. 154(b) by 90 days.

(21) Appl. No.: 17/033,791

(22) Filed: Sep. 27, 2020

(65) Prior Publication Data

US 2021/0133246 A1    May 6, 2021

Related U.S. Application Data

(60) Provisional application No. 62/929,751, filed on Nov. 1, 2019.

(51) Int. Cl.
  *G06F 16/901* (2019.01)
  *G06F 16/903* (2019.01)
  *G06F 17/16* (2006.01)

(52) U.S. Cl.
  CPC .... *G06F 16/9024* (2019.01); *G06F 16/90335* (2019.01); *G06F 17/16* (2013.01)

(58) Field of Classification Search
  None
  See application file for complete search history.

(56) References Cited

U.S. PATENT DOCUMENTS

| | | | |
|---|---|---|---|
| 7,296,009 B1 | 11/2007 | Jiang et al. | |
| 10,210,180 B2 * | 2/2019 | Barel | G06F 16/2255 |

(Continued)

FOREIGN PATENT DOCUMENTS

| | | |
|---|---|---|
| CN | 101432684 A | 5/2009 |
| CN | 106549675 A | 3/2017 |

(Continued)

OTHER PUBLICATIONS

Bilegsaikhan Naidan et al, "Permutation Search Methods are Efficient, yet Faster Search is Possible", Proceedings of the VLDB Endowment, vol. 8, No. 12, 13 pages, Oct. 31, 2016.*

(Continued)

*Primary Examiner* — Uyen T Le
(74) *Attorney, Agent, or Firm* — NORTH WEBER & BAUGH LLP

(57) ABSTRACT

Presented herein are embodiments of a fast search on graph methodology for Maximum Inner Product Search (MIPS). This optimization problem is challenging since traditional Approximate Nearest Neighbor (ANN) search methods may not perform efficiently in the nonmetric similarity measure. Embodiments herein are based on the property that a Möbius/Möbius-like transformation introduces an isomorphism between a subgraph of $\ell^2$-Delaunay graph and Delaunay graph for inner product. Under this observation, embodiments of a novel graph indexing and searching methodology are presented to find the optimal solution with the largest inner product with the query. Experiments show significant improvements compared to existing methods.

20 Claims, 27 Drawing Sheets

(56) References Cited

U.S. PATENT DOCUMENTS

| | | | |
|---|---|---|---|
| 11,309,087 | B2 | 4/2022 | Holcomb |
| 2003/0120630 | A1* | 6/2003 | Tunkelang ............ G06F 16/355 |
| 2007/0192316 | A1* | 8/2007 | Lee ..................... G06F 16/2462 |
| 2008/0172375 | A1 | 7/2008 | Burges |
| 2019/0065594 | A1 | 2/2019 | Lytkin |
| 2019/0377792 | A1 | 12/2019 | Zhang |
| 2021/0157851 | A1* | 5/2021 | Aoyama ............... G06F 16/906 |

FOREIGN PATENT DOCUMENTS

| | | | | |
|---|---|---|---|---|
| CN | 108710626 | A | | 10/2018 |
| CN | 110008256 | A | | 7/2019 |
| CN | 110326253 | A | | 10/2019 |
| CN | 110476151 | A | * | 11/2019 ............ G06F 16/23 |
| DK | 177161 | B1 | * | 3/2012 ........... G06F 16/583 |
| EP | 3779733 | A1 | * | 2/2021 ......... G06F 16/2246 |

OTHER PUBLICATIONS

Ville Hyvonen et al, "Fast Nearest Neighbor Search through Sparse Random Projections and Voting", 2016 IEEE International Conference on Big Data (Big Data), 8 pages.*

Xiao Yan, Jinfeng Li, Xinyan Dai, Hongzhi Chen, and James Cheng. Norm-ranging LSH for maximum inner product search. In Advances in Neural Information Processing Systems (NeurIPS), pp. 2956-2965, Montreal, Canada, 2018. (Year: 2018).*

Boytsov, Leonid, et al. "Off the beaten path: Let's replace term-based retrieval with k-NN search." Proceedings of the 25th ACM international on conference on information and knowledge management. 2016 (Year: 2016).*

Kennes, Robert, and Philippe Smets. "Computational aspects of the Mobius transform." arXiv preprint arXiv:1304.1122 (2013) (Year: 2013).*

Shao, Jie, Heng Tao Shen, and Xiaofang Zhou. "Challenges and techniques for effective and efficient similarity search in large video databases." Proceedings of the VLDB Endowment 1.2 (2008): 1598-1603. (Year: 2008).*

Potamias M, Bonchi F, Gionis A, Kollios G. Nearest-neighbor queries in probabilistic graphs. Oct. 21, 2009). http://www.cs.bu.edu. Jul. 14, 2009. (Year: 2009).*

Indyk et al.,"Approximate nearest neighbors: Towards removing the curse of dimensionality," In Proceedings of the 30th Annual ACM Symposium on the Theory of Computing (STOC) [Abstract], 1998. (3pgs).

J. Kleinberg,"The small-world phenomenon: an algorithmic perspective," In Proceedings of the 32nd Annual ACM Symposium on Theory of Computing (STOC), 2000. (14pgs).

Kühnel et al.,"Liouville's theorem in conformal geometry," Journal de mathématiques pures et appliquées, 88(3):251-260, 2007. (10pgs).

Li et al.,"GPU-Based Minwise Hashing: GPU-based minwise hashing," In Proceedings of the 21st World Wide Web Conference (WWW) [Abstract], 2012. (2 pgs).

Malkov et al.,"Approximate nearest neighbor algorithm based on navigable small world graphs," Information Systems,[Abstract] 2014. (2pgs).

Weston et al.,"Large scale image annotation: learning to rank with joint word-image embeddings," Machine Learning, 2010. (16 pgs).

Xue et al.,"Deep matrix factorization models for recommender systems," In Proceedings of the 26th International Joint Conference on Artificial Intelligence (IJCAI), 2017.(7pgs.

Yu et al.,"A greedy approach for budgeted maximum inner product search," In Advances in Neural Information Processing Systems (NIPS), 2017. (10pgs).

Yu et al.,"Large-scale multi-label learning with missing labels," In Proceedings of the 31th International Conference on Machine Learning (ICML), 2014. (9pgs).

Zhao et al.,"SONG: Approximate Nearest Neighbor Search on GPU," In 35th IEEE International Conference on Data Engineering (ICDE) [Abstract], 2020. (3pgs).

Neyshabur et al.,"On symmetric and asymmetric lshs for inner product search," In Proceedings of the 32nd International Conference on Machine Learning (ICML), 2015. (9pgs).

Ram et al.,"Maximum inner-product search using cone trees," In the 18th ACM SIGKDD International Conference on Knowledge Discovery & Data Mining (KDD), 2012. (9pgs).

Shrivastava et al.,"Asymmetric LSH (ALSH) for sublinear time maximum inner product search (MIPS)," arXiv preprint arXiv:1405.5869, 2014. (19pgs).

Shrivastava et al.,"Asymmetric minwise hashing for indexing binary inner products and set containment," In Proceedings of the 24th International Conference on World Wide Web (WWW), 2015. (11pgs).

Shrivastava et al.,"Improved asymmetric locality sensitive hashing (ALSH) for maximum inner product search (MIPS)," In Proceedings of the 31st Conference on Uncertainty in Artificial Intelligence (UAI), 2015. (10pgs).

Tan et al.,"On Efficient Retrieval of Top Similarity Vectors," In Proceedings of the 2019 Conference on Empirical Methods in Natural Language Processing (EMNLP), 2019. (11pgs).

Tan et al.,"Fast item ranking under neural network based measures," In Proceedings of the 13th ACM International Conference on Web Search & Data Mining (WSDM), 2020. (9pgs).

Bachrach et al.,"Speeding up the Xbox recommender system using a Euclidean transformation for inner-product spaces," In 8th ACM Conference on Recommender Systems (RecSys), 2014. (8pgs).

Barber et al.,"The Quickhull Algorithm for Convex Hulls," ACM Transactions on Mathematical Software (TOMS), 22(4):469-483,1996. (15pgs).

Beaumont et al.,"VoroNet: A scalable object network based on voronoi tessellations," In 21th International Parallel & Distributed Processing Symposium (IPDPS), 2007. (10pgs).

Bengio et al.,"A Neural Probabilistic Language Model,"Journal of Machine Learning Research, 3:1137-1155, 2003. (19pgs).

L. Cayton,"Fast Nearest Neighbor Retrieval for Bregman Divergences," In Proceedings of the 25th International Conference on Machine learning (ICML), 2008. (8pgs).

Curtin et al.,"Dual-Tree Fast Exact Max-Kernel Search," Statistical Analysis and Data Mining: The ASA Data Science Journal, 7(4):229-253, 2014. (25pgs).

Fan et al.,"MOBIUS: Towards the Next Generation of Query-Ad Matchingin Baidu's Sponsored Search," In Proceedings of the 25th ACM SIGKDD International Conference on Knowledge Discovery & Data Mining, (KDD), 2019. (9pgs).

S. Fortune,"Voronoi diagrams and delaunay triangulations,"In Handbook of Discrete & Computational Geometry, 1995. (12pgs).

Friedman et al.,"An algorithm for finding nearest neighbors," IEEE Transactions on Computers [Abstract], 1975. (3pgs).

Friedman et al.,"An algorithm for finding best matches in logarithmic expected time,"ACM Transactions on Mathematical Software, 1977. (39pgs).

George et al.,"Delaunay triangulation and meshing," 1998. (1pg).

Guo et al.,"Quantization based Fast Inner Product Search," arXiv preprint arXiv:1509.01469, 2015. (17pgs).

He et al.,"Neural Collaborative Filtering," arXiv preprint arXiv:1708.05031, 2017. (10pgs).

Hu et al.,"Collaborative filtering for implicit feedback datasets," In Proceedings of the 8th IEEE International Conference on Data Mining (ICDM), 2008. (10pgs).

Non-Final Office Action dated Jul. 18, 2022, in related U.S. Appl. No. 17/023,283 (10pgs).

Liu et al.,"Understanding and Improving Proximity Graph Based Maximum Inner Product Search," In the Thirty-Fourth AAAI Conference on Artificial Intelligence (AAAI-20), 2020. (8pgs).

Non-Final Office Action dated Oct. 5, 2022, in related U.S. Appl. No. 17/095,548 (8pgs).

Response filed Oct. 18, 2022, in related U.S. Appl. No. 17/023,283 (8pgs).

Andoni et al.,"Practical and optimal LSH for angular distance," In NIPS, 2015. (16pgs).

Arora et al.,"HD-Index: Pushing the scalability-accuracy boundary for approximate KNN search in high-dimensional spaces," arXiv preprint arXiv:1804.06829, 2018. (16pgs).

(56) References Cited

OTHER PUBLICATIONS

Arvind et al.,"Symmetric min-max heap: a simpler data structure for double-ended priority queue," Information Processing Letters, 69(4):197-199, 1999. (3pgs).
Aumuller et al.,"Ann-benchmarks: A benchmarking tool for approximate nearest neighbor algorithms," arXiv preprint arXiv:1807.05614, 2018. (20pgs).
F. Aurenhammer,"Voronoi diagrams—A survey of a fundamental geometric data structure," ACM Computing Surveys, vol. 23, No. 3, Sep. 1991. (61pgs).
Baranchuk et al.,"Revisiting the Inverted Indices for Billion-Scale Approximate Nearest Neighbors," In ECCV, 2018. (15pgs).
A. Z. Broder,"On the resemblance and containment of documents," In the Compression and Complexity of Sequences, 1997. (9pgs).
L. Cayton,"Fast nearest neighbor retrieval for bregman divergences," In ICML, 2008. (8pgs).
M. S. Charikar,"Similarity Estimation Techniques from Rounding Algorithms," In STOC, 2002. (9pgs).
Chen et al.,"Robust and fast similarity search for moving object trajectories," In SIGMOD, 2005. (12pgs).
Curtin et al.,"Fast exact max-kernel search," arXiv preprint arXiv:1210.6287, 2012. (12pgs).
De Vries et al.,"Efficient k-NN search on vertically decomposed data," In SIGMOD, 2002. (12pgs).
Dearholt et al.,"Monotonic search networks for computer vision databases," In ACSSC, 1988. [Abstract] (6 pgs).
Fan et al.,"Cuckoo filter: Practically better than bloom," In CoNEXT, 2014. (13pgs).
Fan et al.,"MOBIUS: towards the next generation of query-ad matching in baidu's sponsored search," In KDD 2019. [Abstract] (5 pgs).
Friedman et al.,"An algorithm for finding nearest neighbors," IEEE Transactions on Computers, 24:1000-1006, 1975. (22pgs).
Friedman et al.,"An algorithm for finding best matches in logarithmic expected time," ACM Transactions on Mathematical Software, 3:209-226, 1977. (18pgs).
Fu et al.,"Efanna: An extremely fast approximate nearest neighbor search algorithm based on knn graph," arXiv preprint arXiv:1609.07228, 2016. (20pgs).
Fu et al.,"Fast approximate nearest neighbor search with the navigating spreading-out graph," arXiv preprint arXiv:1707.00143, 2018. (21pgs).
Fu et al.,"MapGraph: A High Level API for Fast Development of High Performance Graph Analytics on GPUs," In Grades, 2014. (6pgs).
Levy et al.,"A strong baseline for learning cross-lingual word embeddings from sentence alignments," In Proceedings of the 15th Conference of the European Chapter of the Association for Computational Linguistics, vol. 1, pp. 765-774, 2017. (10 pgs).
Li et al.,"GPU-Based Minwise Hashing," In Proceedings of the 21st World Wide Web Conference (WWW), 2012. (2pgs).
Liu et al.,"Representation learning using multi-task deep neural networks for semantic classification and information retrieval," In Proceedings of the 2015 Conference of the North American Chapter of the Association for Computational Linguistics: Human Language Technologies (NAACL-HLT), 2015. (10pgs).
Malkov et al.,"Efficient and robust approximate nearest neighbor search using hierarchical navigable small world graphs," IEEE transactions on pattern analysis and machine intelligence, 2018. (13 pgs).
Mikolov et al.,"Efficient estimation of word representations in vector space," arXiv preprint arXiv:1301.3781, 2013. (12pgs).
Mikolov et al.,"Distributed representations of words and phrases and their compositionality,"In Advances in Neural Information Processing Systems (NIPS), 2013. (9pgs).
Morozov et al.,"Nonmetric similarity graphs for maximum inner product search," In Advances in Neural Information Processing Systems (NeurIPS),2018. (10pgs).
Indyk et al.,"Approximate nearest neighbors:Towards removing the curse of dimensionality," In STOC, 1998. (10 pgs).
Jegou et al.,"Product quantization for nearest neighbor search," IEEE transactions on pattern analysis and machine intelligence, 33(1):117-128, 2011. (14pgs).
Jegou et al.,"Hamming embedding and weak geometric consistency for large scale image search," In ECCV, 2008. (15pgs).
Jia et al.,"Dissecting the NVIDIA volta GPU architecture via microbenchmarking," arXiv preprint arXiv:1804.06826, 2018. (66 pgs).
Jin et al.,"Fast and accurate hashing via iterative nearest neighbors expansion," IEEE Trans. Cybernetics, 44(11):2167-2177, 2014. [Abstract] (3 pgs).
Johnson et al.,"Billion-scale similarity search with GPUs," arXiv preprint arXiv:1702.08734, 2017. (12pgs).
Khorasani et al.,"CuSha: Vertex-centric graph processing on GPUs," In HPDC, 2014. (13pgs).
Kim et al.,"Gts: A fast and scalable graph processing method based on streaming topology to GPUs," In SIGMOD, 2016. [Abstract] (4pgs).
P. Li.,"Linearized GMM kernels and normalized random Fourier features," In KDD 2017, 2017. (10pgs).
Li et al.,"Sign cauchy projections and chi-square kernel," In NIPS 2013. (9pgs).
Xu et al.,"Deep learning for matching in search and recommendation," In the 41st International ACM SIGIR Conference on Research and Development in Information Retrieval (SIGIR), 2018. (55pgs).
Yan et al.,"Norm-ranging lsh for maximum inner product search,"In Advances in Neural Information Processing Systems (NeurIPS),2018. (10pgs).
Yoon et al.,"Synonym discovery with etymology-based word embeddings," arXiv preprint arXiv:1709.10445, 2017. (6pgs).
Yu et al.,"A greedy approach for budgeted maximum inner product search," arXiv preprint arXiv:1610.03317, 2016. (21pgs).
Zhao et al.,"SONG: Approximate Nearest Neighbor Search on GPU," 2020 IEEE 36th International Conference on Data Engineering (ICDE), 2020. (12pgs).
Friedman et al.,"An algorithm for finding best matches in logarithmic expected time," In ACM Transactions on Mathematical Software, 3:209-226, 1977. (18 pgs).
Gao et al.,"Learning continuous phrase representations for translation modeling," In Proceedings of the 52nd Annual Meeting of the Association for Computational Linguistics (ACL), vol. 1, pp. 699-709, 2014. (11pgs).
Gong et al.,"Document similarity for texts of varying lengths via hidden topics," In Proceedings of the 56th Annual Meeting of the Association for Computational Linguistics (ACL), vol. 1, pp. 2341-2351, 2018. (11 pgs).
Guo et al.,"Quantization based fast inner product search," In Artificial Intelligence and Statistics (AISTATS), pp. 482-490, 2016. (9pgs).
Hu et al.,"Collaborative filtering for implicit feedback datasets," In Proceedings of the Eighth IEEE International Conference on Data Mining (ICDM), 2008. (10 pgs).
Huang et al.,"Learning deep structured semantic models for web search using clickthrough data," In Proceedings of the 22nd ACM International Conference on Information Knowledge Management (CIKM), 2013. (8pgs).
Huang et al.,"Accurate and fast asymmetric locality-sensitive hashing scheme for maximum inner product search," In Proceedings of the 24th ACM SIGKDD International Conference on Knowledge Discovery & Data Mining (KDD), pp. 1561-1570, 2018. (10 pgs).
Indyk et al.,"Approximate nearest neighbors: Towards removing the curse of dimensionality," In Proceedings of the 13th Annual ACM Symposium on the Theory of Computing (STOC), 1998. (10 pgs).
Joulin et al.,"Fasttext.zip: Compressing text classification models," arXiv preprint arXiv:1612.03651, 2016. (13 pgs).
Kalantidis et al.,"Locally optimized product quantization for approximate nearest neighbor search," In Proceedings of the IEEE Conference on Computer Vision and Pattern Recognition (CVPR), 2014. (8 pgs).
Koper et al.,"Analogies in complex verb meaning shifts: the effect of affect in semantic similarity models," In Proceedings of the 2018

(56) References Cited

OTHER PUBLICATIONS

Conference of the North American Chapter of the Association for Computational Linguistics:Human Language Technologies (NAACLHLT), 2018. (7 pgs).
Lee et al.,"Reasoning in vector space: An exploratory study of question answering," arXiv preprint arXiv:1511.06426, 2016. (12 pgs).
G. T. Toussaint,"The relative neighbourhood graph of a finite planar set," Pattern recognition, 12(4):261-268, 1980. [Abstract] (3pgs).
Wang et al.,"FLASH: Randomized algorithms accelerated over CPUGPU for ultra-high dimensional similarity search," arXiv preprint arXiv:1709.01190, 2018. (15 pgs).
Wang et al.,"Gunrock: A high-performance graph processing library on the gpu," In SIGPLAN 2016. (12 pgs).
Wu et al.,"Multiscale quantization for fast similarity search," In NIPS, 2017. (11pgs).
Wu et al.,"Fast and unified local search for random walk based knearest-neighbor query in large graphs," In SIGMOD, 2014. (12pgs).
Zhang et al.,"Finepar: Irregularity-aware fine-grained workload partitioning on integrated architectures," In CGO, 2017. (13 pgs).
Zheng et al.,"Lazylsh: Approximate nearest neighbor search for multiple distance functions with a single index," In SIGMOD, 2016. (15 pgs).
Zhou et al.,"Mobius transformation for fast inner product search on graph," In NeurIPS, 2019. (12 pgs).
Groh et al.,"GGNN: Graph-based GPU Nearest Neighbor Search," arXiv preprint arXiv:1912.01059, 2019. (10pgs).
Wang et al.,"A Comprehensive Survey and Experimental Comparison of Graph-Based Approximate Nearest Neighbor Search," arXiv preprint arXiv: 2101.12631, 2021. (22pgs).
Srinivas et al.,"A weighted tag similarity measure based on a collaborative weight model," In Proceedings of the 2nd International Workshop on Search and Mining User-Generated Contents, 2010. (8pgs).
Sugawara et al.,"On approximately searching for similar word embeddings," In Proceedings of the 54th Annual Meeting of the Association for Computational Linguistics (ACL), 2016. (11pgs).
Sultan et al.,"Bayesian supervised domain adaptation for short text similarity," In Proceedings of the 2016 Conference of the North American Chapter of the Association for Computational Linguistics: Human Language Technologies (NAACL-HLT), 2016. (10pgs).
Sun et al.,"A simple approach to learn polysemous word embeddings," arXiv preprint arXiv:1707.01793, 2017. (9 pgs).
Tan et al.,"Fast Item Ranking under Neural Network based Measures," Proceedings of the 13th International Conference on Web Search and Data Mining, 2020. [Abstract] (7pgs).
Vaswani et al.,"Attention is all you need," In Advances in Neural Information Processing Systems (NIPS), 2017. (11pgs).
Wu et al.,"Multiscale quantization for fast similarity search," In Advances in Neural Information Processing Systems (NIPS), 2017. (11pgs).
Pennington et al.,"Glove: Global vectors for word representation," In Empirical Methods in Natural Language Processing (EMNLP), 2014. (12 pgs).
Plank et al.,"Embedding semantic similarity in tree kernels for domain adaptation of relation extraction," In Proceedings of the 51st Annual Meeting of the Association for Computational Linguistics (ACL), vol. 1, pp. 1498-1507, 2013. (10pgs).
Putra et al.,"Evaluating text coherence based on semantic similarity graph," In Proceedings of TextGraphs-11: the Workshop on Graph-based Methods for Natural Language Processing, pp. 76-85, 2017. (10pgs).
Ramage et al.,"Random walks for text semantic similarity," In Proceedings of the 2009 workshop on graph-based methods for natural language processing, 2009. (9pgs).
Sahami et al.,"A web-based kernel function for measuring the similarity of short text snippets," In Proceedings of the 15th International Conference on World Wide Web (WWW), 2006. (10pgs).

Shrivastava et al.,"Asymmetric LSH (ALSH) for sublinear time maximum inner product search (MIPS)," In Advances in Neural Information Processing Systems (NIPS), 2014. (9pgs).
Shrivastava et al.,"Improved asymmetric locality sensitive hashing (ALSH) for maximum inner product search (MIPS),"arXiv preprint arXiv:1410.5410, 2014. (9pgs).
Li et al.,"GPU-based minwise hashing:Gpu-based minwise hashing," In WWW 2012, 2012. [Abstract] (4pgs).
W. Li et al.,"Approximate nearest neighbor search on high dimensional data: Experiments, analyses, and improvement," arXiv preprint arXiv:1610.02455, 2016. (26pgs).
W. Litwin,"Linear hashing: a new tool for file and table addressing," In VLDB, 1980. (12pgs).
H. Liu et al.,"iBFS: Concurrent Breadth-First Search on GPUs," In SIGMOD, 2016. (14 pgs).
Liu et al.,"Enterprise: Breadth-first graph traversal on gpus," In SC, 2015. (12pgs).
Malkov et al.,"Approximate nearest neighbor algorithm based on navigable small world graphs," Information Systems, 45:61-68, 2014. (8 pgs).
D. Merrill et al.,"Scalable GPU graph traversal," In SIGPLAN, 2012. (11pgs).
M. Mitzenmacher,"Compressed bloom filters," IEEE/ACM Transactions on Networking (TON), 10(5):604-612, 2002. (9 pgs).
Morozov et al.,"Non-metric similarity graphs for maximum inner product search," In NIPS, 2018. (10pgs).
Muja et al.,"Scalable nearest neighbor algorithms for high dimensional data," Pattern Analysis and Machine Intelligence, IEEE Transactions on, 36, 2014. (14pgs).
Ram et al.,"Maximum inner-product search using cone trees," In KDD, 2012. (9pgs).
H. Seo et al.,"GStream: A graph streaming processing method for large-scale graphs on GPUs," In SIGPLAN, 2015. (43pgs).
X. Shi et al.,"Graph processing on gpus: A survey," CSUR, 2018. (35pgs).
X. Shi et al.,"Optimization of asynchronous graph processing on GPU with hybrid coloring model," SIGPLAN, 2015. (3pgs).
Shrivastava et al.,"Fast near neighbor search in high-dimensional binary data," In ECML, 2012. (38pgs).
Tan et al.,"Fast item ranking under neural network based measures," In WSDM, 2020. [Abstract] (3pgs).
Tan et al.,"On efficient retrieval of top similarity vectors," In EMNLP, 2019. (11pgs).
Teodoro et al.,"Approximate similarity search for online multimedia services on distributed CPU-GPU platforms," arXiv preprint arXiv:1209.0410, 2012. (25pgs).
Acree et al.,"Comparing and evaluating cosine similarity scores, weighted cosine similarity scores and substring matching," Technical report, 2016. [Abstract] (1pg).
Agirre et al.,"SemEval—2012 Task 6: A Pilot on Semantic Textual Similarity," In Proceedings of the 1st Joint Conference on Lexical & Computational Semantics (SEM), 2012.(9pgs).
F. Aurenhammer,"Voronoi Diagrams—a survey of a fundamental geometric data structure," ACM Computing Surveys (CSUR), 23(3):345-405,1991. (61pgs).
Bachrach et al.,"Speeding up the Xbox recommender system using a euclidean transformation for inner-product spaces," In Proceedings of the 8th ACM Conference on Recommender systems (RecSys), 2014. (8pgs).
C. Bradford Barber et al.,"The Quickhull Algorithm for Convex Hulls," ACM Transactions on Mathematical Software (TOMS), 22(4):469-483, 1996. (15pgs).
Bengio et al.,"A neural probabilistic language model," Journal of Machine Learning Research, 2003. (19pgs).
Cignoni et al.,"DeWall: A fast divide and conquer delaunay triangulation algorithm in Ed," Computer-Aided Design, 30(5):333-341, 1998. [Abstract] (3 pgs).
Faruqui et al.,"Problems with evaluation of word embeddings using word similarity tasks," arXiv preprint arXiv:1605.02276, 2016. (6 pgs).
Friedman et al.,"An algorithm for finding nearest neighbors," In IEEE Transactions on Computers, 24:1000-1006, 1975. [Abstract] (3pgs).

(56) References Cited

OTHER PUBLICATIONS

Notice of Allowance & Fee(s) Due dated May 17, 2023, in related U.S. Appl. No. 17/095,548 (7pgs).
Final Office Action dated Feb. 28, 2023, in related U.S. Appl. No. 17/023,283 (13pgs).
Response filed Jan. 4, 2023, in related U.S. Appl. No. 17/095,548 (13pgs).
Notice of Allowance & Fee(s) Due dated Mar. 31, 2023, in related U.S. Appl. No. 17/095,548 (7pgs).
Response filed May 30, 2023, in related U.S. Appl. No. 17/023,283 (15pgs).
Non-Final Office Action dated Dec. 5, 2023, in related U.S. Appl. No. 17/023,283 (13pgs).
Notice of Allowance & Fee(s) Due dated Nov. 21, 2023, in related U.S. Appl. No. 17/095,548 (7pgs).
Response filed Nov. 10, 2023, in related U.S. Appl. No. 17/023,283 (12pgs).
Chinese Office Action dated Aug. 30, 2023, in related Chinese Application No. 202011119294.1 (30pgs).
Morozov et al., "Non-metric Similarity Graphs for Maximum Inner Product Search," In 32nd Conference on Neural Information Processing Systems (NeurIPS), 2018. (10pgs).
Notice of Allowance & Fee(s) Due dated Sep. 6, 2023, in related U.S. Appl. No. 17/095,548 (7pgs).
Final Office Action dated Sep. 13, 2023, in related U.S. Appl. No. 17/023,283 (12pgs).
Garcia et al.,"Fast k nearest neighbor search using gpu," arXiv preprint arXiv:0804.1448, 2008. (15pgs).
Garcia et al.,"K-nearest neighbor search: Fast GPU-based implementations and application to high-dimensional feature matching," In ICIP, 2010. (4pgs).
Ge et al.,"Optimized product quantization for approximate nearest neighbor search," In CVPR, 2013. (8pgs).
Gionis et al.,"Similarity search in high dimensions via hashing," In VLDB, 1999. (12pgs).
Goemans et al.,"Improved approximation algorithms for maximum cut and satisfiability problems using semidefinite programming," Journal of ACM, 42(6):1115-1145, 1995. (31pgs).
Hajebi et al.,"Fast approximate nearest-neighbor search with k-nearest neighbor graph," In IJCAI, 2011. (6 pgs).
Hart et al.,"A formal basis for the heuristic determination of minimum cost paths," IEEE transactions on Systems Science and Cybernetics, 1968. [Abstract] (2 pgs).
He et al.,"In-cache query co-processing on coupled cpu-gpu architectures," VLDB, 2014. (12pgs).
Hong et al.,"Accelerating cuda graph algorithms at maximum warp," In SIGPLAN, 2011. (10 pgs).
Huang et al.,"Query-aware locality-sensitive hashing for approximate nearest neighbor search," VLDB, 2015. (13pgs).
Response filed Mar. 5, 2024, in related U.S. Appl. No. 17/023,283 (12pgs).

* cited by examiner

600

- 605 — Receive as input a set of queries $Q$, a dataset $S$, a number of elements to be returned $K$, a size of candidate set $k$ for graph construction, a size $l$ for greedy search, and a maximum outgoing degree of graph $d$

- 610 — Construct a graph using the dataset $S$, the size of candidate set $k$ for graph construction, and the maximum outgoing degree of graph $d$

- 615 — For a query element in the set of queries, perform a greedy search using the graph and inner product as a measurement function

- 620 — For a query element in the set of queries, output a set of top-$K$ elements $C_q$ in descending order of inner product with $q$

FIG. 6

TRANSFORMATION FOR FAST INNER PRODUCT SEARCH ON GRAPH

CROSS-REFERENCE TO RELATED APPLICATION

This patent application is related to and claims priority benefit under 35 USC § 119 to and commonly-owned U.S. Pat. App. No. 62/929,751, filed on 1 Nov. 2019, entitled "MÖBIUS TRANSFORMATION FOR FAST INNER PRODUCT SEARCH ON GRAPH," and listing Shulong Tan, Zhixin Zhou, Zhaozhuo Xu, and Ping Li as inventors, which patent document is incorporated by reference herein in its entirety and for all purposes.

BACKGROUND

A. Technical Field

The present disclosure relates generally to systems and methods for computer learning that can provide improved computer performance, features, and uses. More particularly, the present disclosure relates to systems and methods for fast searching.

B. Background

Deep learning (DL) has been widely applied in many different fields, such as computer vision, natural language processing, medical image processing, and so on. Increasingly, deep learning has formed a foundation for the relatively recent artificial intelligence/machine learning (AI/ML) revolution, which has impacted numerous industries and created several more. In many applications, performing searches quickly is important.

Accordingly, what is needed are systems and methods for fast searching on datasets comprising high dimensional representations, such as high dimensional vectors.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

FIG. 6 depicts an overall method, according to embodiments of the present disclosure.

DETAILED DESCRIPTION OF EMBODIMENTS

Figure 1:
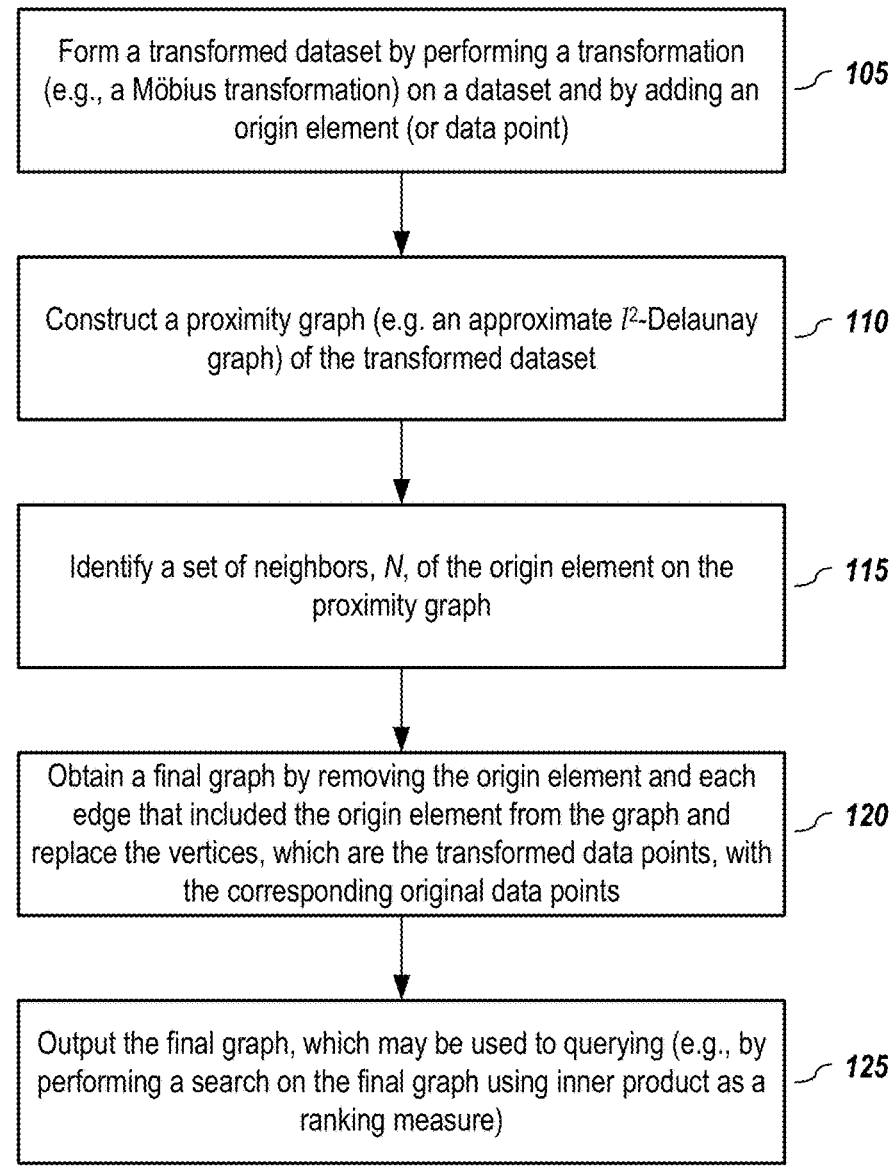
FIG. 1 depicts a methodology for generating a graph and using the graph for searching, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. The terms "include," "including," "comprise," and "comprising" shall be understood to be open terms and any lists the follow are examples and not meant to be limited to the listed items. A "layer" may comprise one or more operations. The words "optimal," "optimize," "optimization," and the like refer to an improvement of an outcome or a process and do not require that the specified outcome or process has achieved an "optimal" or peak state. The use of memory, database, information base, data store, tables, hardware, cache, and the like may be used herein to refer to system component or components into which information may be entered or otherwise recorded.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); and (5) an acceptable outcome has been reached.

One skilled in the art shall recognize that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

A. General Introduction

One of the focuses herein is on a discrete optimization problem. Given a large dataset S with high dimensional vectors and a query point q in Euclidean space, an aim is to search for $x \in S$ that maximizes the inner product $x^T q$. Rigorously speaking, embodiments of an efficient methodology for computing the following are developed:

$$p = \underset{x \in S}{\mathrm{argmax}}\ x^T q. \tag{1}$$

This so-called Maximum Inner Product Search (MIPS) problem has wide applicability in machine learning models, such as recommender system, natural language processing and multi-class or multi-label classifier, computational advertising for search engines, etc. Because of its importance and popularity, there has been substantial research on effective and efficient MIPS algorithms.

The early approaches proposed tree-based methods to solve the MIPS problem. Recently, there is a line of works in the literature that tried to transform MIPS to traditional Approximate Nearest Neighbor (ANN) search by lifting the base data vectors and query vectors asymmetrically to higher dimensional space. After the transformation, a well-developed ANN search method may then be applied to solve the MIPS problem. There are other proposals designed for the MIPS task, including quantization-based methods and graph-based methods.

In this patent document, embodiments of a new graph-based MIPS methodology are presented. Graph-based methods have been developed for ANN search in metric space and show significant superiority. Recent work, namely ip-NSW, attempts to extend the graph-based methods for ANN search to MIPS. The authors of the ip-NSW approach introduced the concepts of IP-Delaunay graph, which is the smallest graph that can guarantee the return of exact solutions for MIPS by greedy search. Practically, ip-NSW tries to approximate the IP-Delaunay graph via Navigable Small World (NSW) and Hierarchical Navigable Small World (HNSW). To expand beyond existing approaches, embodiments of graph-based methods for MIPS are presented, which preserve the advantages of similarity graph in metric space.

Embodiments herein are based on a transformation on the dataset, that connects graph-based indices for MIPS and ANN search. It was found that under Möbius or Möbius-like transformation, there is an isomorphism between two graphs: (a) IP-Delaunay graph before the transformation; and (b) a subgraph of the Delaunay triangulation w.r.t. (with respect to) $\ell^2$-norm ($\ell^2$-Delaunay graph) after the transformation. Based on this observation, in one or more embodiments, IP-Delaunay graph may be approximated, in one or more embodiments, in two steps: (i) map the data points via Möbius/Möbius-like transformation; and (ii) approximate $\ell^2$-Delaunay graph on the transformed data points and one additional point for the origin. Afterward, in one or more embodiments, given a query point, a greedy search may be performed on the obtained graph by comparing inner product of the query with data points (nodes/vertices in the graph) in the original format.

The embodiments discussed herein are superior for at least two reasons: (a) the $\ell^2$-distance based graph construction can preserve all advantageous features of similarity graph in metric space; and (b) the additional point (i.e., the origin) will be connected to diverse high norm points (usually solutions for MIPS), which will naturally provide good starting points for the greedy search. The empirical experiments demonstrate that these features significantly improve the efficiency.

B. Graph-Based Search Methods and Search Embodiments

A graph-based search method typically first constructs a well-designed similarity graph, e.g., kNN graph in Approximate Nearest Neighbor (ANN) search, then performs greedy search on the graph. Simple greedy search, such as for Maximum Inner Product Search (MIPS) task, may be described as follows. Given a graph and a query, an embodiment of the methodology randomly selects a vertex from the graph, then evaluates the inner product of the query with the randomly seeded vertex and the vertex's neighbors. If one of its neighbors has a larger inner product with the query than the vertex itself, then one considers the neighbor as a newly seeded vertex and repeats the searching step. This procedure stops when it finds a vertex that has a larger inner product with the query than all the vertex's neighbors. Greedy search has a generalized version, which will be introduced in Methodology 1, infra.

It was pointed out by some that in order to discover the exact solution of nearest neighbor search or MIPS by a greedy search strategy, the graph should contain the Delaunay graph (see Definition 2, infra) with respect to (w.r.t.) the searching measure as a subgraph. For common ANN search cases, searching w.r.t. $\ell^2$-distance, the index graph should contain the Delaunay graph w.r.t $\ell^2$-distance (referred as $\ell^2$-Delaunay graph) as a subgraph. In practice, approximate $\ell^2$-Delaunay graphs are usually constructed due to the difficulty in building the exact Delaunay graphs, such as VoroNet and Navigable Small World (NSW). Based on NSW, Hierarchical-NSW (HNSW) network exploits the hierarchical graph structure and heuristic edge selection criterion (see Methodology 3, infra, for details), and often obtains performance improvement in ANN search tasks.

In one or more embodiments, the idea of the Delaunay graph may be extended to inner product. The best graph for exact MIPS by simple greedy search is the Delaunay graph w.r.t. inner product (referred as IP-Delaunay graph). Stanislav Morozov and Artem Babenko in "Non-metric similarity graphs for maximum inner product search," in *Advances in Neural Information Processing Systems* (*NeurIPS*), pages 4726-4735, Montreal, Canada (2018), disclose ip-NSW, which attempts to extend HNSW for metric spaces to MIPS. It is worth noting that the authors of the above-cited paper show some important properties of Delaunay graph. However, their HNSW-based graph construction algorithm for inner product has some disadvantages, including:

(1) Since the edge selection criterion of HNSW does not apply on inner product, the incident edges of a vertex can have very similar directions, which will reduce the efficiency.

(2) The hierarchical graph structure of HNSW is helpful in ANN search for metric measures, but it has little effect on the MIPS problem.

These claims are validated by experiments on comparison with different versions of ip-NSW. The effect of edge selection can be positive or negative in different datasets. Hierarchical structure does not change the efficiency of inner product search. To resolve the edge selection issue, previously in commonly-assigned U.S. patent application Ser. No. 17/023,283, filed on 16 Sep. 2020, titled "EFFICIENT RETRIEVAL OF TOP SIMILARITY REPRESENTATIONS," listing Shulong Tan, Zhixin Zhou, Zhaozhuo Xu, and Ping Li as inventors, which claims priority to under 35 USC § 119(e) to U.S. Pat. Appl. No. 62/923,459, filed on 18 Oct. 2019, titled "EFFICIENT RETRIEVAL OF TOP SIMILARITY REPRESENTATIONS," listing Shulong Tan, Zhixin Zhou, Zhaozhuo Xu, and Ping Li as inventors (which documents are incorporated by reference herein in their entireties), embodiments of proper edge selection methods, generally referred to as IPDG, were disclosed for inner product. IPDG embodiments improves the top-1 MIPS significantly but some embodiments show some potential performance limitations for top-n (n>1) results. In this patent documents, embodiments of a different approximation of IP-Delaunay graph (referred to as Möbius-Graph/Möbius-like Graph) for MIPS, which provides a state-of-the-art MIPS methodology for various top-n MIPS results.

One intuition is that if a transformation that maps IP-Delaunay graph in the original space to a proximity graph's (e.g., a $\ell^2$-Delaunay graph's) certain subgraph in the transformed space can be found, full use of the successful $\ell^2$-Delaunay graph approximation methods may be made to build an IP-Delaunay graph. Given each data point $x_i$, a transformation $y_i := x_i / \|x_i\|^m$ is performed, where m is an exponent (m>1 and m=2 is a Möbius transformation), which yields a new data collection: $\tilde{S} = \{0, y_1, y_2, \ldots, y_n\}$. After transformation, an existing graph construction method (e.g., HNSW or a SONG embodiment (SONG embodiments are described in commonly-assigned U.S. Pat. Appl. No. 62/940,043, filed on 25 Nov. 2019, titled "APPROXIMATE NEAREST NEIGHBOR SEARCH FOR PARALLEL PROCESSING HARDWARE COMPONENTS," listing Weijie Zhao, Shulong Tan, and Ping Li as inventors (which document is incorporated by reference herein in its entirety)) may be applied and a proximity graph (e.g., an approximate $\ell^2$-Delaunay graph) on the transformed data (i.e., $\tilde{S}$) is obtained. It was found that the IP-Delaunay graph w.r.t. S is isomorphic to the neighborhood of 0 in a proximity graph w.r.t. $\tilde{S}$. Details about this statement are found in Section C, infra. In short, one or more embodiments may be summarized as the following steps and depicted in FIG. 1:

1. Form (105) a transformed dataset by performing a transformation. For example, in one or more embodiments, let $\tilde{S} := \{y_i = x_i / \|x_i\|^m | x_i \in S\} \cup \{0\}$ be the transformed dataset, where m>1 (and when m=2 is a Möbius transformation).

2. Construct (110) a proximity graph (e.g, an approximate $\ell^2$-Delaunay graph, (e.g., HNSW)), w.r.t. $\tilde{S}$, which is the transformed dataset.

3. Identify (115) a set of neighbors, N, of the origin element, 0, on the proximity graph. For example, let N denote the neighbors of 0 on the graph from the previous step. Then, in one or more embodiments, a final graph may be obtained (120) by removing 0 and its incident edges from the graph, and by replacing the vertices $y_i$ with the original data vectors $x_i$.

4. Output (125) the final graph, which may be used for searching. For example, in one or more embodiments, let N be initial vertices, then, for a query element, perform greedy inner product search on the graph, in which inner product is used as a ranking measure.

Note that, in one or more embodiments, the greedy search method starts from a set of initial points instead of the data point 0 since 0 is not in S. Multiple initial points are possible in generalized greedy search described in Methodology 1. An equivalent description is starting from 0 but never returning it as a result. Compared with the existing graph-based search method for MIPS (i.e., ip-NSW), embodiments herein build the index graph by $\ell^2$-distance (on the transformed data), which largely preserve advantageous features of a metric similarity graph. Besides, embodiments start searching from well-chosen diverse top-norm points N (the usage is similar as the hierarchical structure of HNSW), which leads to more efficient performance. Therefore, embodiments overcome, to a large extent, the weakness of the existing graph-based search method, and it is not surprising that embodiments perform empirically better.

C. Transformation and Delaunay Graph Isomorphism Embodiments

To find the exact nearest neighbor by simple greedy search, the graph should contain Delaunay graph as a subgraph. This statement may be extended to the MIPS problem. For generality, Voronoi cell and Delaunay graph may be introduced for arbitrary continuous binary function $f: X \times X \to \mathbb{R}$; however, of interest in one or more embodiments herein are the cases of inner product $f(x,y)=x^\tau y$ and negative $\ell^2$-norm $f(x,y)=-\|x-y\|$.

Definition 1:
For fixed $x_i \in S \subset X$ and a given function $f$, the Voronoi cell $R_i$ may be defined as:

$$R_i := R_i(f, S) := \{q \in X | \forall x \in S, f(x_i, q) \geq f(x, q)\}.$$

In one or more embodiments, Voronoi cells determine the solution of the MIPS problem. One can observe from the definition above that, when $f(x,y)=x^\tau y$, $x_j \in \mathrm{argmax}_{x_i \in S} x_i^\tau q$ if and only if $q \in R_j$. Since recording Voronoi cells can be expensive. Its dual diagram may be recorded instead, namely Delaunay graph, which may be defined as follows.

Definition 2:
For fixed function $f$ and dataset $S \subset X$, and given Voronoi cells $R_i$, $i=1, 2, \ldots, n$ w.r.t. $f$ and $S$, the Delaunay graph is an undirected graph with vertices $S$, and the edge $\{x_i, x_j\}$ exists if and only if $R_i \cap R_j \neq \emptyset$.

A Delaunay graph records adjacency of Voronoi cells. If cell $R_i$ and cell $R_j$ are adjacent to each other, then there exists an edge between their corresponding nodes $x_i$ and $x_j$. If $f(x,y)=-\|x-y\|$, then the graph is called an $\ell^2$-Delaunay graph. If $f(x,y)=x^\tau y$, then the graph is called an IP-Delaunay graph.

In one or more embodiments, the scope of the MIPS problem may now be narrowed. Let $f(x,y)=x^\tau y$ and $X=\mathbb{R}^d \setminus \{0\}$, and an aim is to solve the optimization problem of Eq. (1). In one or more embodiments, 0 is removed from $\mathbb{R}^d$ for at least two reasons. Firstly, 0 has the same inner product value with any points. Secondly, if 0 is not removed, then every Voronoi cell w.r.t. the inner product contains 0 as a common element, so the Delaunay graph will be fully connected and not interesting. In one or more embodiments, the following mild assumption on dataset may be made to simplify the analysis.

Assumption 1:
The dataset $S$ satisfies that its conical hull is the whole space. More precisely, $$coni(S) := \left\{ \sum_{i=1}^n \alpha_i x_i | x_i \in S, \alpha_i \geq 0 \right\} = \mathbb{R}^d. \tag{A1}$$

Assumption 2 (General Position):
For $k=2, 3, \ldots, d+1$, there does not exist $k$ points of the dataset $S$ that lie on a $(k-2)$-dimensional affine hyperplane, or $k+1$ points of $S$ on any $(k-2)$-dimensional sphere. If so, then it may be said that dataset $S$ is in general position.

Assumptions 1 and 2 are often mild in real data. When the data points are embedded vectors of users, items, (in recommender system) entities, or sentence (in natural language processing). In these scenarios, the entries of data vectors are distributed on the whole real line. With high probability, each hyperoctant contains at least one data point so that the convex hull of the dataset contains 0 as an interior point. Assumption 2 holds with probability one if the data vectors in $S$ are independently and identically following any continuous distribution on $\mathbb{R}^d$. For such dataset $S$, the corresponding $\ell^2$-Delaunay graph and IP-Delaunay graph are unique. Now two important criteria of these Delaunay graphs may be introduced.

Proposition 1 (Empty Half-Space Criterion):
For a fixed dataset $S \subset \mathbb{R}^d$, suppose there exists an open half-space $H$ of $\mathbb{R}^d$ satisfying: (a) $x_i$ and $x_j$ are on the boundary of $H$, (b) $H$ contains no data points, then there exists an edge connecting $x_i$ and $x_j$ in IP-Delaunay graph. Conversely, if such an edge exists, then the open half space $H$ must exist.

In other words, empty half-space criterion says, in IP-Delaunay graph, edge $\{x_i, x_j\}$ exists if and only if there is a $(d-1)$-dimensional hyperplane, which passes $x_i$ and $x_j$, such that one of its corresponding open half-space is empty, and the other one contains all data points except $x_i$ and $x_j$. The empty half-space criterion of IP-Delaunay graph is closely related to empty sphere criterion of $\ell^2$-Delaunay graph, as what follows.

Proposition 2 (Empty Sphere Criterion):
For a fixed dataset $S \cup \mathbb{R}^d$, a subset of $d+1$ points of $S$ are fully connected in the $\ell^2$-Delaunay graph corresponding to $S$ if and only if the circumsphere of these points does not contain any other points from the dataset $S$ inside the sphere.

Once this criterion is satisfied, the subgraph of these $d+1$ vertices may be called a d-simplex. The connection between these criterions may be demonstrated by the transformation $$g: \mathbb{R}^d \setminus \{0\} \to \mathbb{R}^d \setminus \{0\}, \; g(x) = \frac{x}{\|x\|^n}, \text{ where } n > 1 \tag{2}$$

Under this transformation, every hyperplane may be mapped to a sphere passing through the origin. This is due to the fact that transforms on $\mathbb{R}^d$ of the form:

$$g(x) = b + \frac{A(x-a)}{\|x-a\|^\epsilon} \tag{3}$$

for orthogonal matrix $A$ and $\epsilon=0$ or 2 are Möbius transformations. Indeed, by Liouville's conformal mapping theorem, for $d>2$, Eq. (3) characterizes all Möbius transformations. An important and useful property of Möbius transformation says, if a hyperplane does not pass through the origin, then its image under any Möbius transformation is a sphere passing through the origin.

FIG. 2A-D shows an example when $d=2$. The line AB in FIG. 2A divides the plane into two open half-spaces. One of the half-space does not contain any data points, so A and B are connected in IP-Delaunay graph by Proposition 1. Let A' and B' be the images of A and B under transformation of Eq. (2). According to the property of Möbius transformation, the image of line AB is the circumcircle of points 0, A', and B' in FIG. 2C. The empty half-space criterion of A and B implies that the circumcircle does not contain any data points inside, so there is a simplex with vertices 0, A' and B' in the $\ell^2$-Delaunay graph by empty sphere criterion. This observation may be formalized as follows:

Theorem 1:

Let $X=\mathbb{R}^d\setminus\{0\}$. Assume S satisfies Assumption 1 and 2. For $i\in[n]$, let $y_i:=x_i/\|x_i\|^2$, $S':=\{y_1, \ldots, y_n\}$ and $\tilde{S}=S'\cup\{0\}$, then the following are equivalent:

(a) The IP-Delaunay graph w.r.t. S contains an edge $\{x_i, x_j\}$.

(b) There exists $a\in\mathbb{R}^d\setminus\{0\}$ such that $$x_i^T a = x_j^T a \geq \max_{x\in S} x^T a > 0.$$

(c) There exists $c\in X$ such that $$\|y_i - c\| = \|y_j - c\| = \|c\| \leq \min_{y\in S'}\|y - c\|.$$

(d) There exists a d-simplex in $\ell^2$-Delaunay graph w.r.t $\tilde{S}$ contains vertices $\{0, y_i, y_j\}$.

Equivalence between (a) and (d) in the theorem implies an isomorphism between IP-Delaunay graph and a subgraph of $\ell^2$-Delaunay graph. Hence, one immediately has the next corollary.

Corollary 1:

The following graphs are isomorphic after removing their isolated vertices:
(a) the IP-Delaunay graph on S,
(b) a subgraph of $\ell^2$-Delaunay graph on $\tilde{S}$ with every edge $\{y_i, y_j\}$ satisfying the following condition: there exists a d-simplex in $\ell^2$-Delaunay graph contains vertices $\{0, y_i, y_j\}$,
where the isomorphism is $x_i \mapsto y_i$ for $x_i$ that are not isolated in IP-Delaunay graph.

Figure 2A:
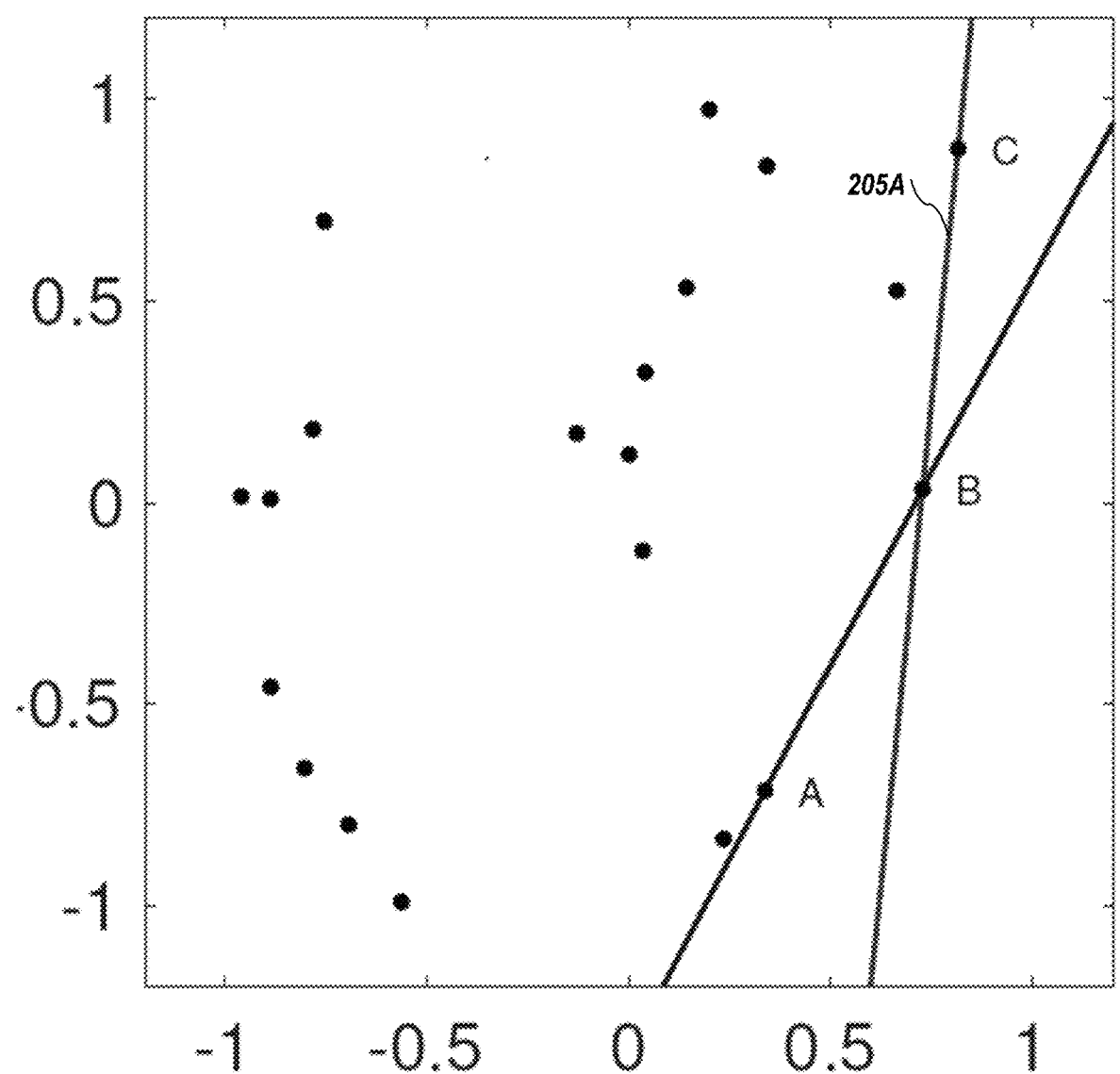
FIG. 2A-D depicts (A) empty half-space criterion for IP-Delaunay graph; (B) the IP-Delaunay graph; (C) empty sphere criterion for $\ell^2$-Delaunay graph after transformation; and (D) the $\ell^2$-Delaunay graph after transformation, according to embodiments of the present disclosure. The edges 205 form the subgraph that is isomorphic to IP-Delaunay graph.
Figure 2B:
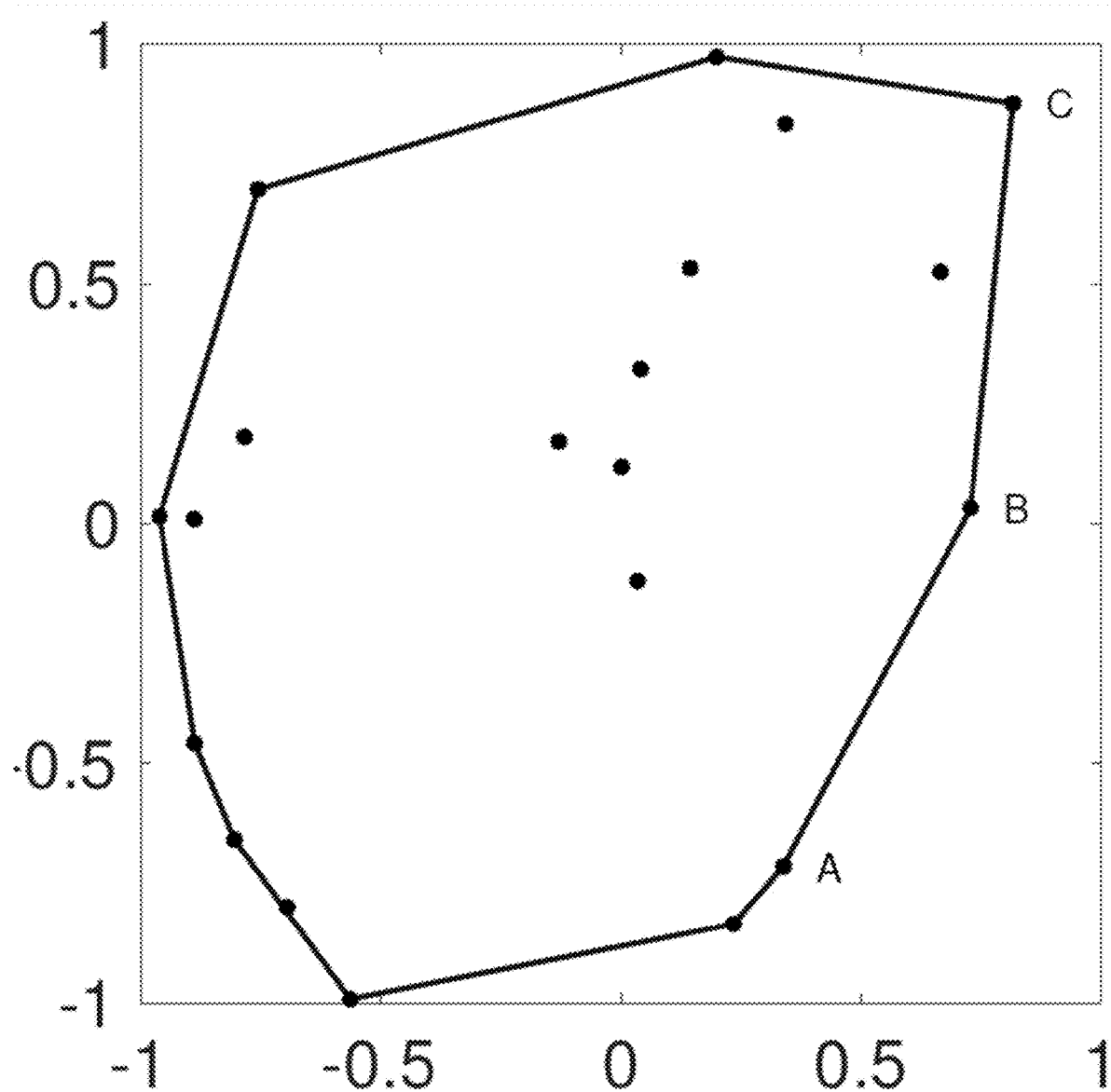
Figure 2C:
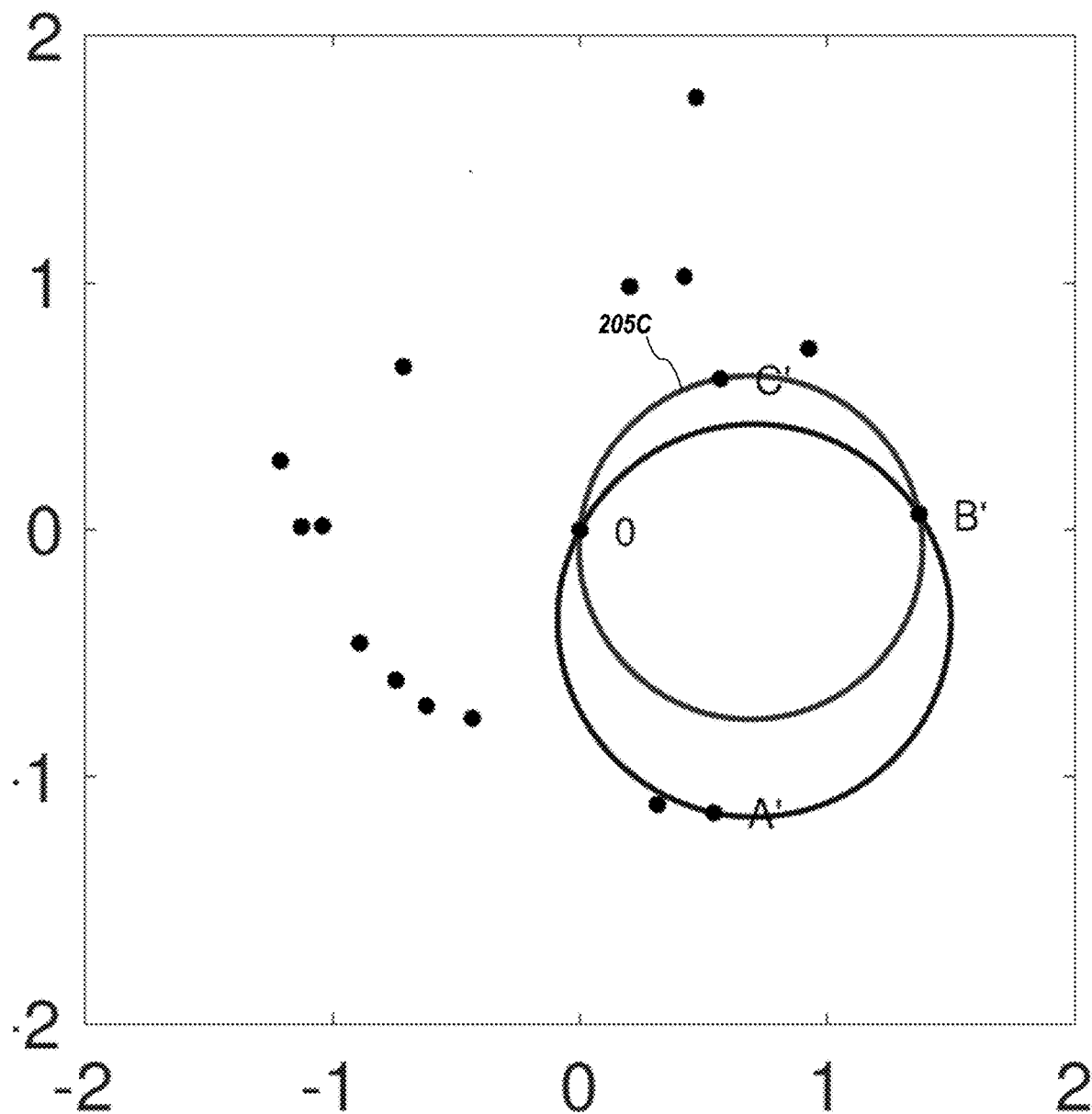
Figure 2D:
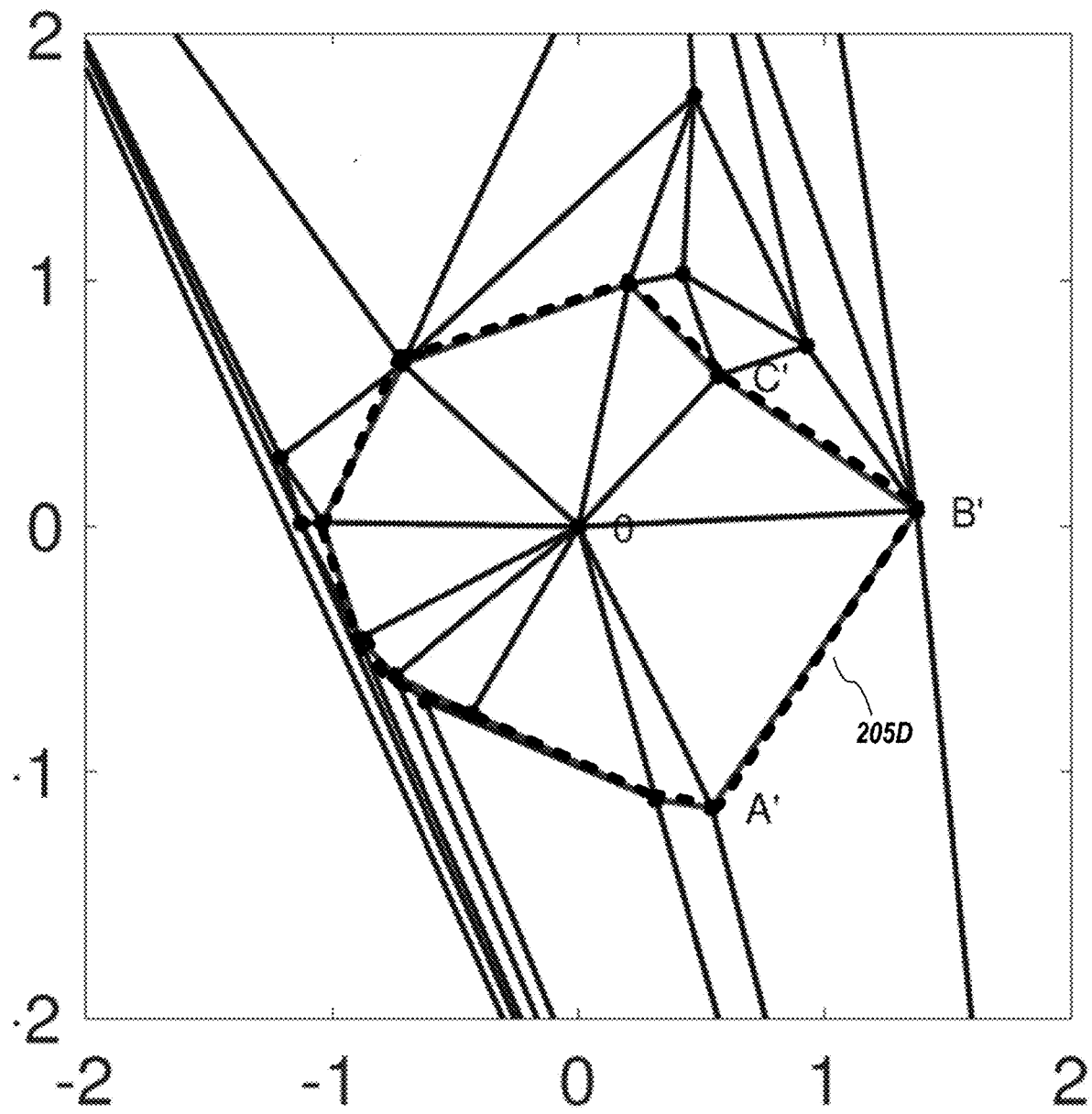

Considering the example in FIG. 2A-D, Corollary 1 says the IP-Delaunay graph in FIG. 2B is isomorphic to the subgraph in dashed line 205D in FIG. 2D. Thus, good approximation of $\ell^2$-Delaunay graph also applies to approximation of IP-Delaunay graph. $\ell$ The next section includes implementation details.

Remark 1 (Convex Hull and Extreme Point):

If a vertex is not isolated in IP-Delaunay graph, then it may be said that it is an extreme point. Under Assumption 1, a point is extreme if and only if it locates on the boundary of the convex hull of S. In this case, building the IP-Delaunay graph is equivalent to finding the convex hull. In Corollary 1, an equivalent way to finding the convex hull of a finite set was derived. For the purpose of convex hull construction, Assumption 1 is not required since it always holds after some translation. It is noted that there exist methods for finding a convex hull. This method is not computationally feasible on high dimensional data, and there does not exist a convex hull approximation in previous work, so embodiments of IP-Delaunay graph approximation by graph isomorphism are presented in this patent document.

D. Implementation in Large High Dimensional Data

For large high dimensional data, finding the exact IP-Delaunay graph of the data points is not computationally feasible. Therefore, practical and efficient graph construction and searching algorithms for large scale data in high dimension are in demand. In this patent document, embodiments of a methodology (an example of which is summarized in Methodology 4) for building a Möbius-Graph and greedy search on it when there is massive high dimensional data. An embodiment of a generalized greedy search method is first introduced because it will be, in one or more embodiments, repeatedly used during graph construction and inner product search.

1. Greedy Search Embodiments

Recall that a goal of greedy search is to find $x\in S$ to maximize $f(x,q)$ for any query q. Here, consider either $f(x,y)=-\|x-y\|$ or $f(x,y)=x^T y$. For simplicity, the nearest neighbor of x is said to be y when y has largest evaluation of $f(x, \cdot)$. In one or more embodiments, a priority queue C may be initialized (it may be, for example, random or well-chosen data points), then the evaluation of $f(x,q)$ for all $x\in C$ and all out-neighbors of these x's is checked. Among those vectors that have been evaluated, C is replaced by the top-k vectors in descending order of evaluation of function $f(\cdot, q)$. The top-k elements in C is considered as the new priority queue. C may be updated until a stop condition is reached (e.g., it does not change anymore). Methodology 1 summarizes this procedure. If k=1, then this generalized greedy search is equivalent to the simple version described in Section B. This generalized greedy search allows the method embodiment to return approximate top-k items, which are valuable for query search and recommender system.

---

METHODOLOGY 1: GREEDY-SEARCH(q, P, G, k, f)

1: Input: query element q, a set of enter points P, graph G = (S, E), number of candidates to return k, measurement function f.
2: Initialize the set of priority queue, C ← P.
3: Mark elements of P as checked and the rest of vertices as unchecked.
4: if |C| > k then
5:     C ← top-k elements of x ∈ C in descending order of f (x, q).
6: while ∃x ∈ S unchecked and C keeps updating do
7:     C ← C ∪ {y ∈ S: x ∈ C, y unchecked, (x, y) ∈ E}
8:     Mark elements of C as checked.
9:     if |C| > k then
10:        C ← top-k elements of x ∈ C in descending order of f (x, q).
11: Output: C.

---

Figure 3:
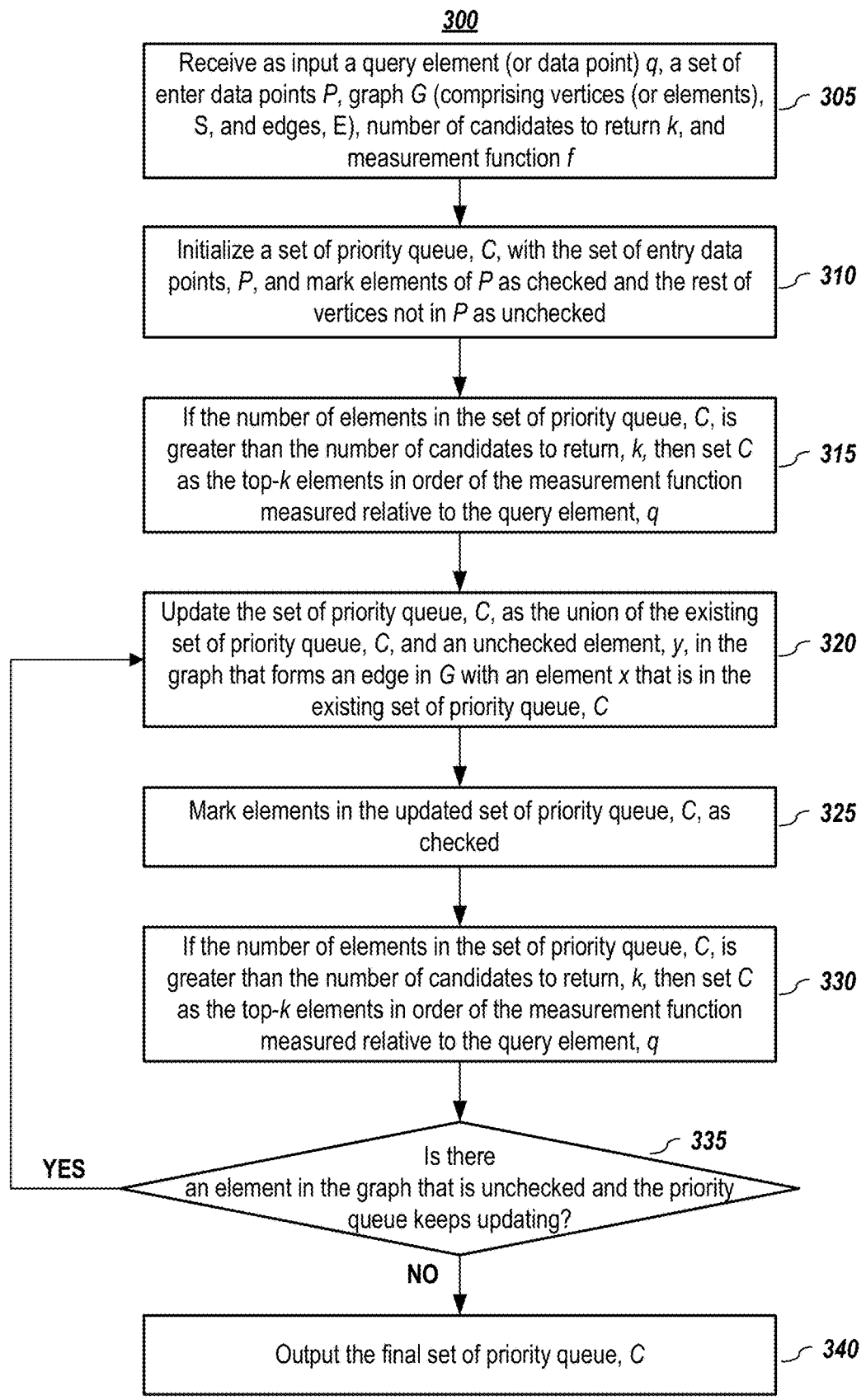
FIG. 3 depicts a method for performing a greedy search, according to embodiments of the present disclosure.

FIG. 3 depicts a method for performing a greedy search, according to embodiments of the present disclosure. In one or more embodiments, a query element (or data point) q, a set of enter data points P, graph G (comprising vertices (or elements), S, and edges E), number of candidates to return k, and measurement function $f$ are given or received (305) as inputs. A set of priority queue, C, may be initialized (310)

with the set of entry data points, P, and elements of P marked as checked and the rest of vertices not in P may be marked as unchecked.

In one or more embodiments, if the number of elements in the set of priority queue, C, is greater than the number of candidates to return, k, then C may be a set (315) as the top-k elements in descending order of the measurement function measured relative to the query element, q.

In one or more embodiments, the set of priority queue, C, is updated (320) as the union of the existing set of priority queue, C, and an unchecked element, y, in the graph that forms an edge in G with an element x that is in the existing set of priority queue, C. Elements in the updated set of priority queue, C, may be marked (325) as checked. In one or more embodiments, if the number of elements in the set of priority queue, C, is greater than the number of candidates to return, k, then C may be a set (330) the top-k elements in order of the measurement function measured relative to the query element, q. It should be noted that the measurement function may be $\ell^2$-distance when greedy search is being done for graph construction, but when querying a completed graph, it may be inner product, as discussed below in Section 4 (Query Embodiments).

If there is an element in the graph that is unchecked and the priority queue keeps updating, the process returns (335) to step 320. Otherwise, in one or more embodiments, the final set of priority queue, C, is output (340).

2. Graph Construction Embodiments

An embodiment of a graph construction methodology is presented below as Methodology 2. By Theorem 1 and Corollary 1, the best graph to use is IP-Delaunay graph on S, which is isomorphic to a subgraph of $\ell^2$-Delaunay graph on $\tilde{S}$ after transformation. Consider HNSW as an $\ell^2$-Delaunay graph approximation. The hierarchy of Delaunay graph may be approximated by edge discrimination. Furthermore, a directed graph may be considered as an approximation to reduce the total degree.

---

METHODOLOGY 2: GRAPH-CONSTRUCTION(S, k, d)

---

1: Input: dataset S, the size of priority queue k, maximum outgoing degree of graph d.

2: $n \leftarrow |S|$. For $i \in [n]$, let $y_i = \dfrac{x_i}{\|x_i\|^n}$ where n is greater than zero 3: $\tilde{S} \leftarrow \{0, y_1, \ldots, y_n\}$. Define $y_0 = 0 \in \tilde{S}$.
4: G ← fully connected graph with vertices $\{y_0, \ldots, y_{d-1}\}$.
5: for i = d to n do
6:    C ← GREEDY-SEARCH($y_i$, {0}, G, k, $\ell^2$-distance).
7:    N ← SELECT-NEIGHBORS($y_i$, C, d).
8:    Add edges ($y_i$, z) to G for every z ∈ N.
9:    for z ∈ N do
10:      C ← {w ∈ $\tilde{S}$ : (z, w) is an edge of G} ∪ {y}.
11:      N ← SELECT-NEIGHBORS(z, C, d).
12:      Let N be the out-neighbors of z in G.
13: P' ← out-neighbors of 0 in graph G.
14: P ← {$x_i$ ∈ S : $y_i$ ∈ P'}.
15: Remove 0 and its incident edges from G and replace the vertices of G by the ones before transformation.
16: Output: (G, P).

---

Given a dataset $\tilde{S}$, in one or more embodiments, the directed graph on $\tilde{S}$ is built iteratively. A directed graph may be initialized by a random graph. In every iteration, for a given directed graph G with vertices $\tilde{S}$, an isolated vertex x is considered and a greedy search (e.g., Methodology 1) may be applied to find k-nearest neighbor of x, say $C_x$. x will be connected to its nearest element, say $y_1$ in the candidate set $C_x$.

Now consider the neighbor set $N(x)=\{y_1\}$. For the next nearest neighbor y, it may be added to the neighbor set N(x) if it satisfies edge selection criterion: $\|x-y\| \leq \min_{z \in N(x)} \|z-y\|$. In one or more embodiments, the iterative process stops when d many valid neighbors are found or when all candidate neighbors have been checked. Methodology 3 represents an embodiment of this procedure, which is presented below in the next subsection.

This edge selection can improve the diversity of the direction of incident edges. This step may be repeated and stopped when either all elements in $C_x$ have been checked or the maximum outdegree d is achieved. The edges (x,y) for y∈N(x) are added to the graph. Moreover, for y∈N(x), x is added to N(y). If |N(y)|>d, then N(y) is updated according to the edge selection criterion. This final step can reduce the effect caused by the random order of vertices. Corollary 1 suggests that IP-Delaunay graph is the neighborhood (in the graph sense) of 0 in $\ell^2$-Delaunay graph. So, for any query q, greedy search may be applied starting from the out-neighbors of 0 (i.e., P in Methodology 2). Then, the method will search the optimal object w.r.t. inner product by greedy search. See Methodology 4 for an example embodiment.

Figure 4:
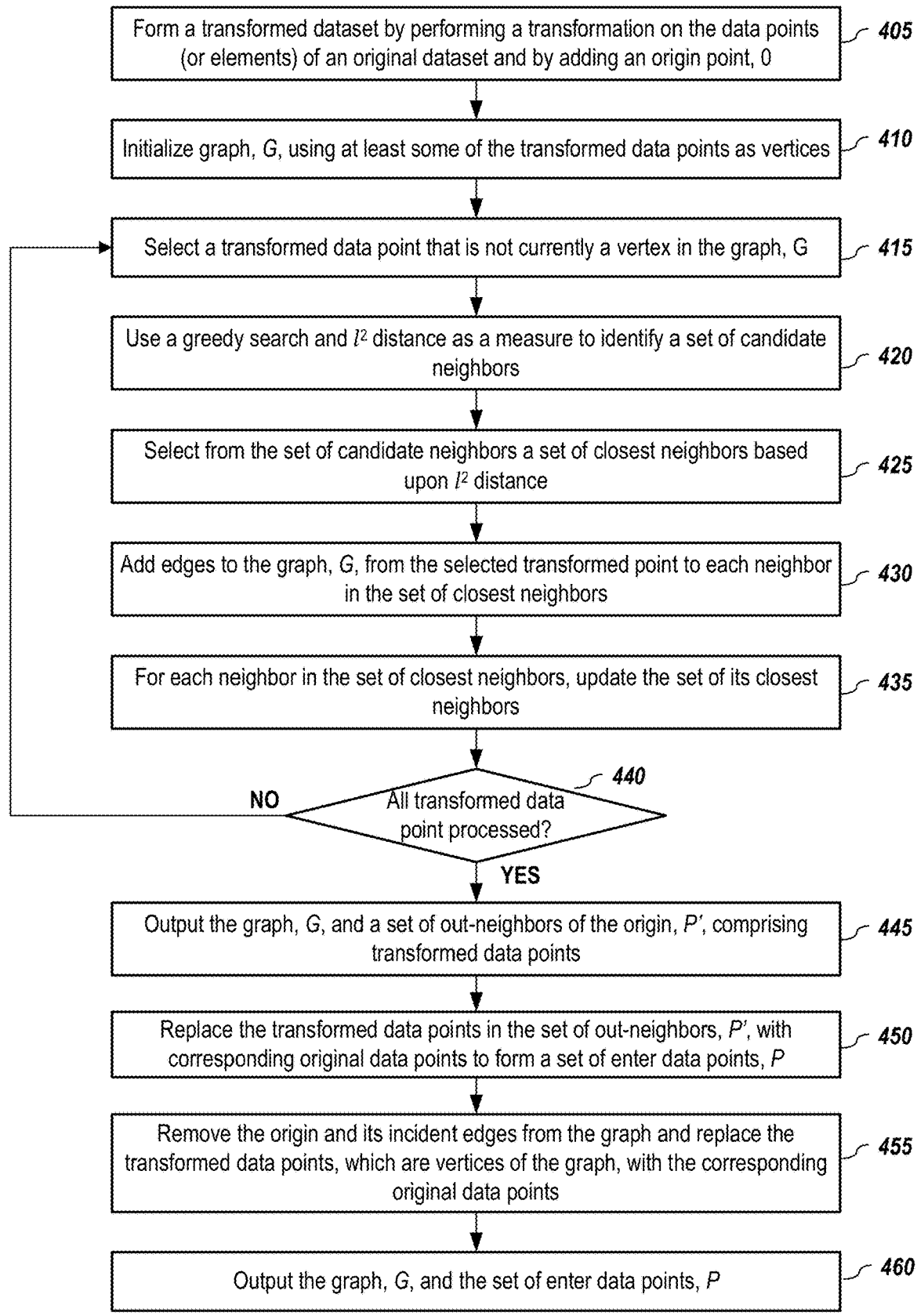
FIG. 4 depicts an alternative method for graph construction, according to embodiments of the present disclosure.

FIG. 4 depicts an alternative method for graph construction, according to embodiments of the present disclosure. In one or more embodiments, a transformed dataset is formed (405) by performing a transformation on the data points (or elements) of an original dataset and by adding an origin point, 0. The graph, G, is initialized (410) using at least some of the transformed data points as vertices. G may be initialized in any of a number of ways—such as an empty graph, a random graph, or a small fully connected graph with origin point included.

In one or more embodiments, a transformed data point (or element) that is not currently a vertex in the graph, G, is selected (415). A search, such as a greedy search discussed above, and $\ell^2$ distance as a measure may then be used (420) to identify a set of candidate neighbors. In one or more embodiments, a set of closest neighbors based upon $\ell^2$ distance are selected from the set of candidate neighbors, and edges are added (425) to the graph, G, from the selected transformed point to each neighbor in the set of closest neighbors. In one or more embodiments, for each neighbor in the set of closest neighbors, the set of its closest neighbors is updated (435).

In one or more embodiments, steps 415-435 are repeated (440) if not all of the transformed data elements have not been processed. However, if all of the transformed data elements have been processed, the graph, G, and a set of out-neighbors of the origin, P', comprising transformed data points, may be output.

In one or more embodiments, the transformed data points in the set of out-neighbors, P', are replaced (450) with the corresponding original data points to form a set of enter data points, P. Also, in one or more embodiments, the origin and its incident edges are removed (455) from the graph and replace the transformed data points, which are vertices/nodes of the graph, with the corresponding original data points.

Finally, as illustrated in FIG. 4, the final graph, G, may be output (460), which may be used to searches. In one or more embodiments, the set of enter data points, P, may also be output.

3. Neighbor Selection Embodiments

Figure 5:
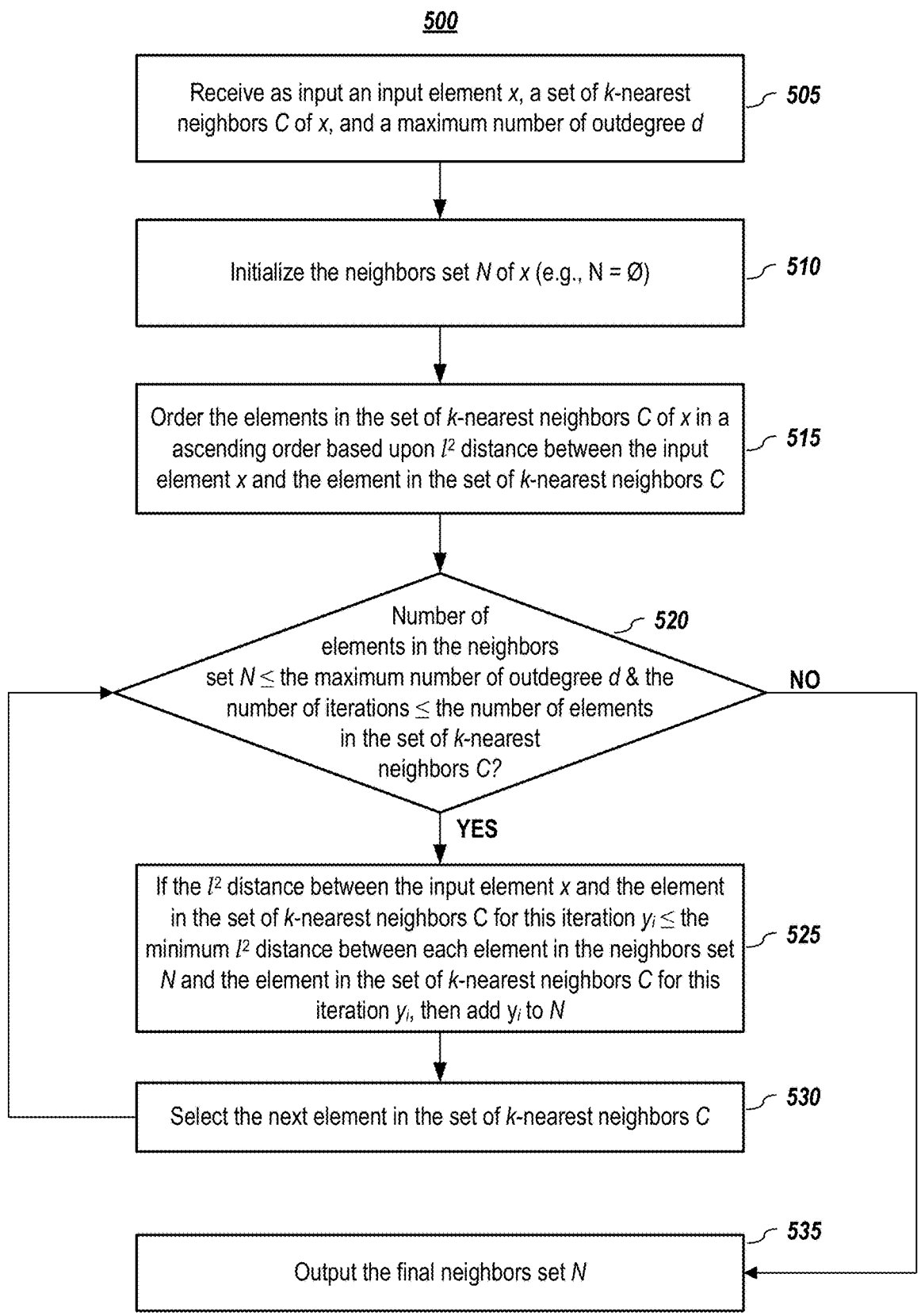
FIG. 5 depicts a method for neighbor selection, according to embodiments of the present disclosure.

FIG. 5 depicts a method for neighbor selection, according to embodiments of the present disclosure. In one or more embodiments, an input element x, a set of k-nearest neighbors C of x, and a maximum number of outdegree d are given (505) or are received as inputs. In one or more embodiments, the neighbors set N of x (e.g., N=∅) is initialized (510), which may be initializing the set to the empty set. The elements in the set of k-nearest neighbors C of x may be ordered (515) in ascending order based upon $\ell^2$ distance between the input element A and the element in the set of k-nearest neighbors C.

While the number of elements in the neighbors set N is less than or equal to the maximum number of outdegrees d and the number of iterations is less than or equal to the number of elements in the set of k-nearest neighbors C, the following steps are performed (520). First, if the $\ell^2$ distance between the input element A and the element in the set of k-nearest neighbors C for this iteration, $y_i$, is less than or equal to the minimum $\ell^2$ distance between each element in the neighbors set N and the element in the set of k-nearest neighbors C for this iteration $y_i$, then $y_i$ is added (525) to N. A next element in the set of k-nearest neighbors C is selected and the process repeats until the while condition 520 indicates stopping. In one or more embodiments, the next element may be selected by using an iteration index, i, that is incremented each iteration.

Once the while process concludes, the final neighbors set N may be output (530) and returned.

Methodology 3 presents an alternative embodiment for selecting neighbor, according to embodiments of the present disclosure.

---

METHODOLOGY 3: SELECT-NEIGHBORS(x, C, d)

---

1: Input: element x, the set of k-nearest neighbors C of x, and maximum outdegree d.
2: Initialize the out-neighbors set N of x (e.g., N ← ∅).
3: Order $y_i \in C$ in ascending order of $\|x - y_i\|$.
4: i ← 1.
5: while |N| ≤ d and i ≤ |C| do
6:   if $\|x - y_i\| \leq \min_{z \in N} \|z - y_i\|$ then
7:     N ← N ∪ {$y_i$}.
8:   i ← i + 1.
9: Output: a set of elements N.

---

4. Query Embodiments

FIG. 6 depicts an overall method, according to embodiments of the present disclosure. In one or more embodiments, a set of queries Q, a dataset S, a number of elements to be returned K, a size of candidate set k for graph construction, a size l for greedy search, and a maximum outgoing degree of graph d are given (605) or are received as inputs. In one or more embodiments, a graph is constructed (610) using the dataset S, the size of candidate set k for graph construction, and the maximum outgoing degree of graph d. Example embodiments of graph construction were presented above.

It shall be noted that if the graph is already constructed, steps 605 and 610 may be omitted.

Given a final graph, in one or more embodiments, for a query element in the set of one or more queries, a search (e.g., a greedy search) is performed (615) using the graph and using inner product as a ranking measure. Following the search, for a query element in the set of queries, a set of top-K elements $C_q$ are output (620). In one or more embodiments, the output may be presented in descending order of inner product with the query element q.

Methodology 4 depicts an alternative embodiment of an overall method, according to embodiments of the present disclosure.

---

METHODOLOGY 4: MIPS(Q, S, K, k, l, d)

---

1: Input: A set of queries Q, dataset S, the number of elements will be returned K, the size of candidate set k for graph construction and l for greedy search, maximum outgoing degree of graph d.
2: (G, P) ← GRAPH-CONSTRUCTION(S, k, d).
3: for q ∈ Q do
4:   $C_q$ ← GREEDY-SEARCH(q, P, G, l, inner product).
5: Output: the set of top-K elements $C_q \subset S$ in descending order of inner product with q for q ∈ Q.

---

E. Experiments

It shall be noted that these experiments and results are provided by way of illustration and were performed under specific conditions using a specific embodiment or embodiments; accordingly, neither these experiments nor their results shall be used to limit the scope of the disclosure of the current patent document.

In this section, embodiments are compared with state-of-the-art MIPS methods, on four datasets (see Table 1): Dataset A, Dataset B, Dataset C, and Dataset D. For Dataset A, 50-dimensional vectors were used. For Datasets B and C, a matrix factorization method was used to get 100-dimensional latent vectors.

TABLE 1

Statistics of the datasets.

| Datasets | # Base Data | # Query Data | # Dimension | # Extreme | % Extreme |
|---|---|---|---|---|---|
| Dataset A | ~17800 | 1000 | 50 | 8017 | 45.12% |
| Dataset B | ~104700 | 7748 | 100 | 3169 | 3.03% |
| Dataset C | ~25800 | 25677 | 100 | 722 | 2.80% |
| Dataset D | ~1000000 | 1000 | 100 | 304431 | 30.44% |

The ground truth of each query vector is the top-1, top-10, and top-100 measuring by the inner product. Only a fraction of data points can be the top-1 solution of Eq. (1), i.e., extreme points in Remark 1, whose percentage is an important feature of the dataset in MIPS problem. The percentage of extreme points for each dataset was estimated as below: for each vector x in the base, its inner product $x^T y$ is calculated with all vector y in the base (including x itself). Then, the number of unique top-1 vector y (i.e., extreme points) are counted and the percentage of extreme points are computed (i.e., last column of Table 1) by dividing by the size of dataset. This may not be an exact estimation, but it is a tight lower bound.

1. Experimental Settings

Figure 7:
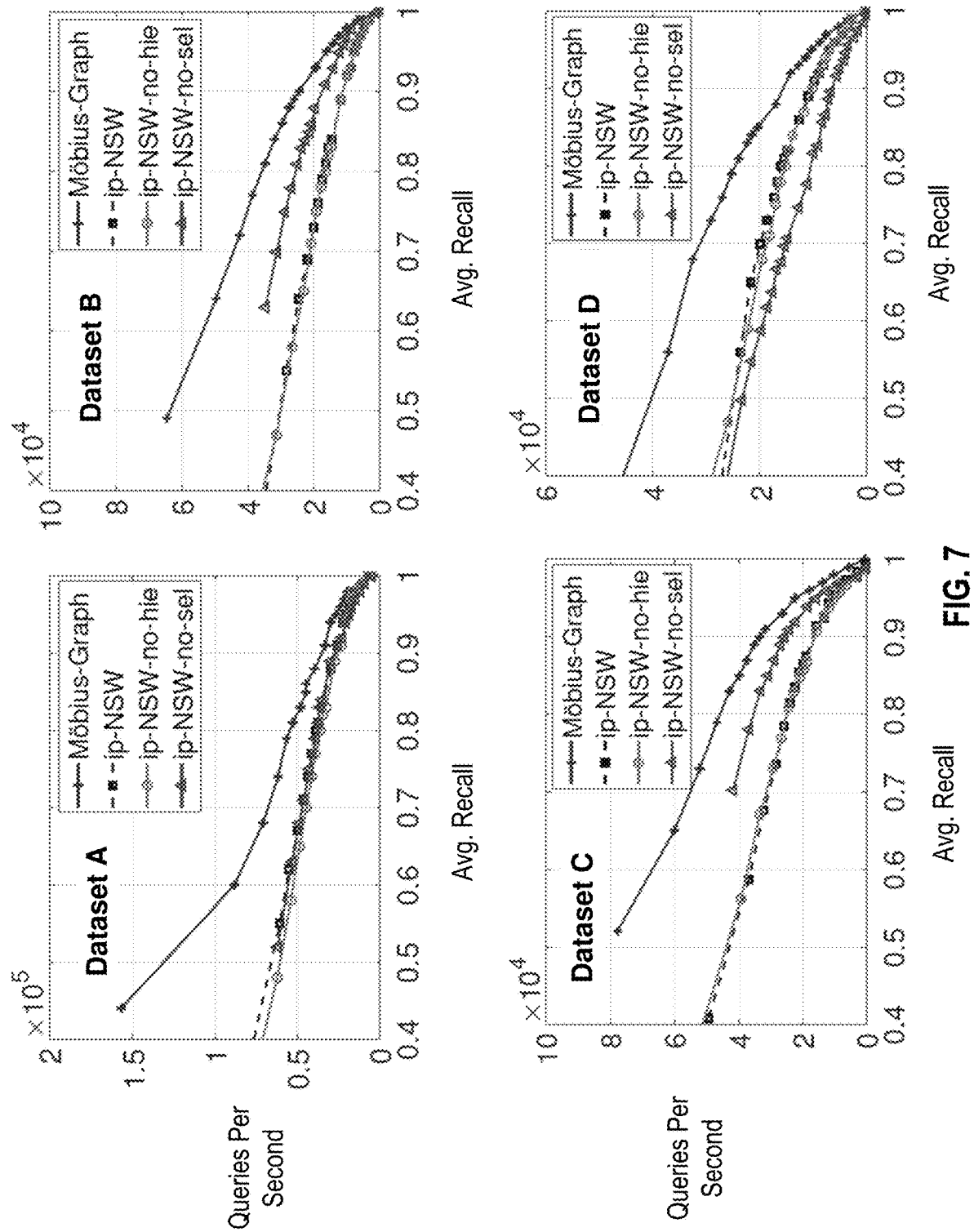
FIG. 7 depicts experimental results for (top-1) Recall vs. Queries Per Second on different datasets, according to embodiments of the present disclosure. The curve on the top shows superiority of the corresponding method. Möbius Graph, ip-NSW, ip-NSW-nohie, ip-NSW-no-sel stand for an embodiment of proposed methodology, ip-NSW with both hierarchical structure and edge selection, ip-NSW without hierarchical structure, and ip-NSW without edge selection, respectively.

For convenience, embodiments of the methodology disclosed herein may be referred to generally as Möbius-Graph, and an embodiment of Möbius-Graph is compared with three previous state-of-the-art MIPS methods, Greedy-MIPS, ip-NSW, and Range-LSH, which are the most representative for MIPS. In Range-LSH, the dataset was first partitioned into small subsets according to the $\ell_2$-norm rank and then the data was normalized using a local maximum $\ell_2$-norm in each sub-dataset. This overcomes the limited performance due to the long-tail distribution of data norms. The authors of the Greedy-MIPS method used an upper bound of the inner product as the approximation of MIPS and designed a greedy search algorithm to find this approximation, called Greedy-MIPS. Their original implementations were used. The open source code of ip-NSW adopts HNSW instead of NSW for graph construction. It was found that the hierarchical structure and heuristic edge selection in HNSW does not significantly improve the performance of ip-NSW; see FIG. 7. To provide comprehensive evaluation, a Möbius-Graph embodiment was implemented by both HNSW and SONG. All comparing methods have tunable parameters. To get a fair comparison, all parameters were varied over a fine grid.

As the evaluation measures, the trade-offs Recall vs. Queries Per Second (QPS) and Recall vs. Percentage of Computations were chosen. Recall vs. Queries Per Second reports the number of queries a method can process per second at each recall level. Ideally, one wishes to have high recall levels, the method can process as many queries as possible (i.e., more efficient). Recall vs. Percentage of Computations checks the pair-wise computations at each recall level, the less the better. For each method, multiple points scattered on the plane by tuning parameters are obtained. To plot curves, the best result, $\max_x$, is first found along the x-axis (i.e., Recall). Then, 100 buckets are produced by splitting the range from 0 to $\max_x$ evenly. For each bucket, the best result along the y-axis (i.e., the biggest amount of queries per second) is chosen. If there are no data points in the bucket, it will be ignored. In this way, there are at most 100 pairs of data for drawing curves. All experiments were performed on a 2×3.00 GHz 8-core i7-5960X CPU server with 32 GB memory.

2. Experimental Results

Figure 8A:
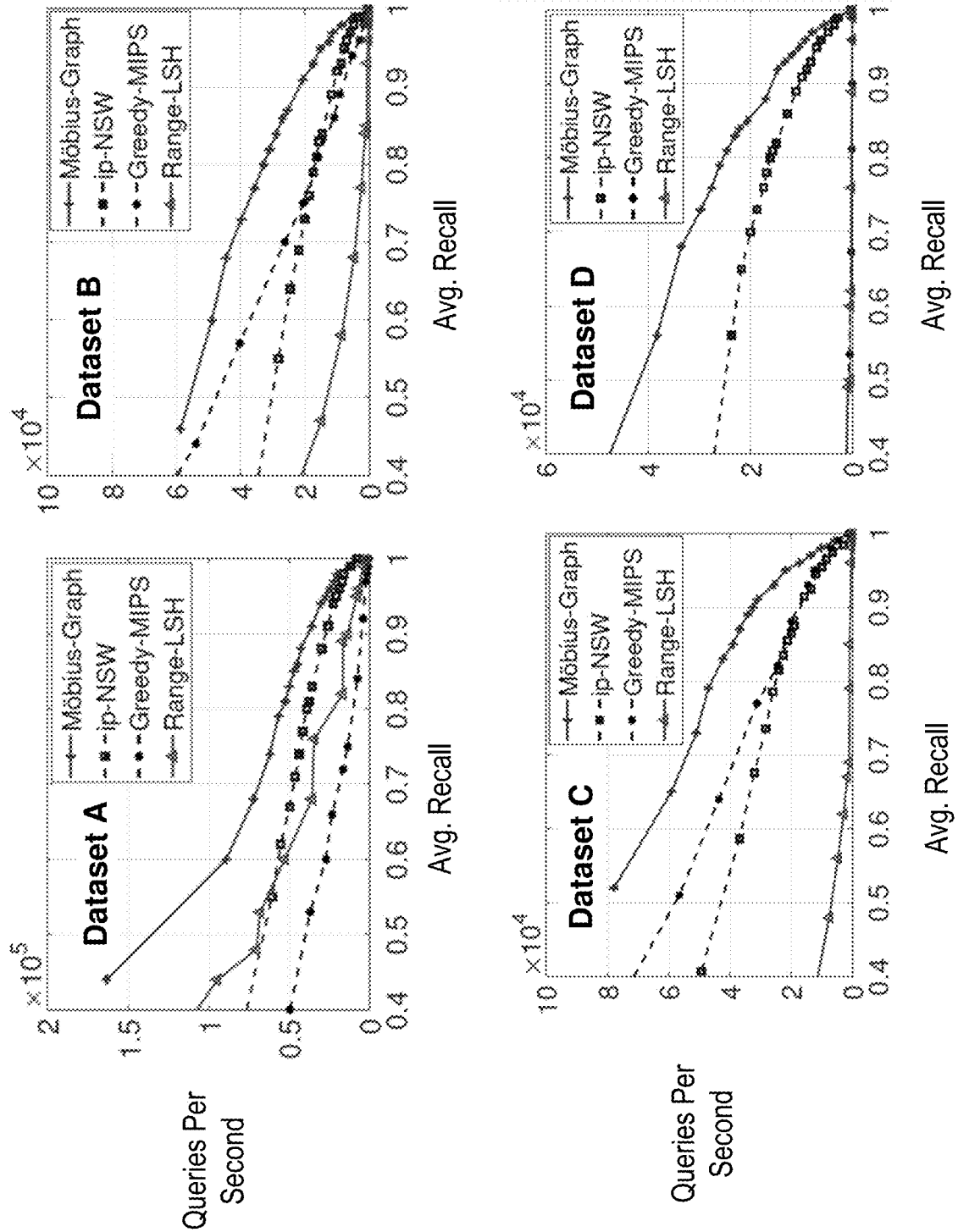
FIG. 8A-C depicts experimental results for Recall vs. Queries Per Second on different datasets, according to embodiments of the present disclosure. The focus was on the top-1, top-10, and top-100 ground-truth labels. Here the best results are in the upper right corners.
Figure 8B:
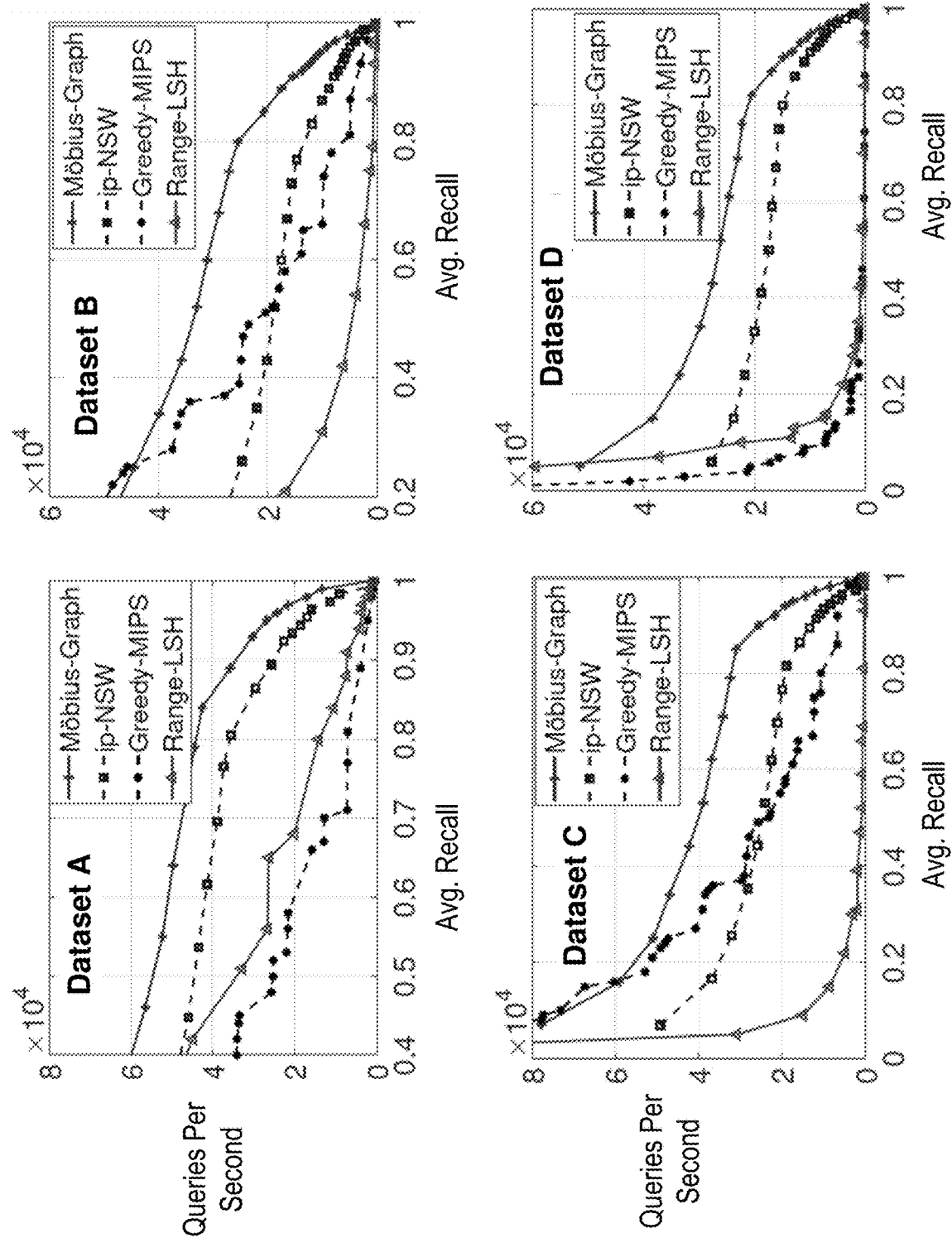
Figure 8C:
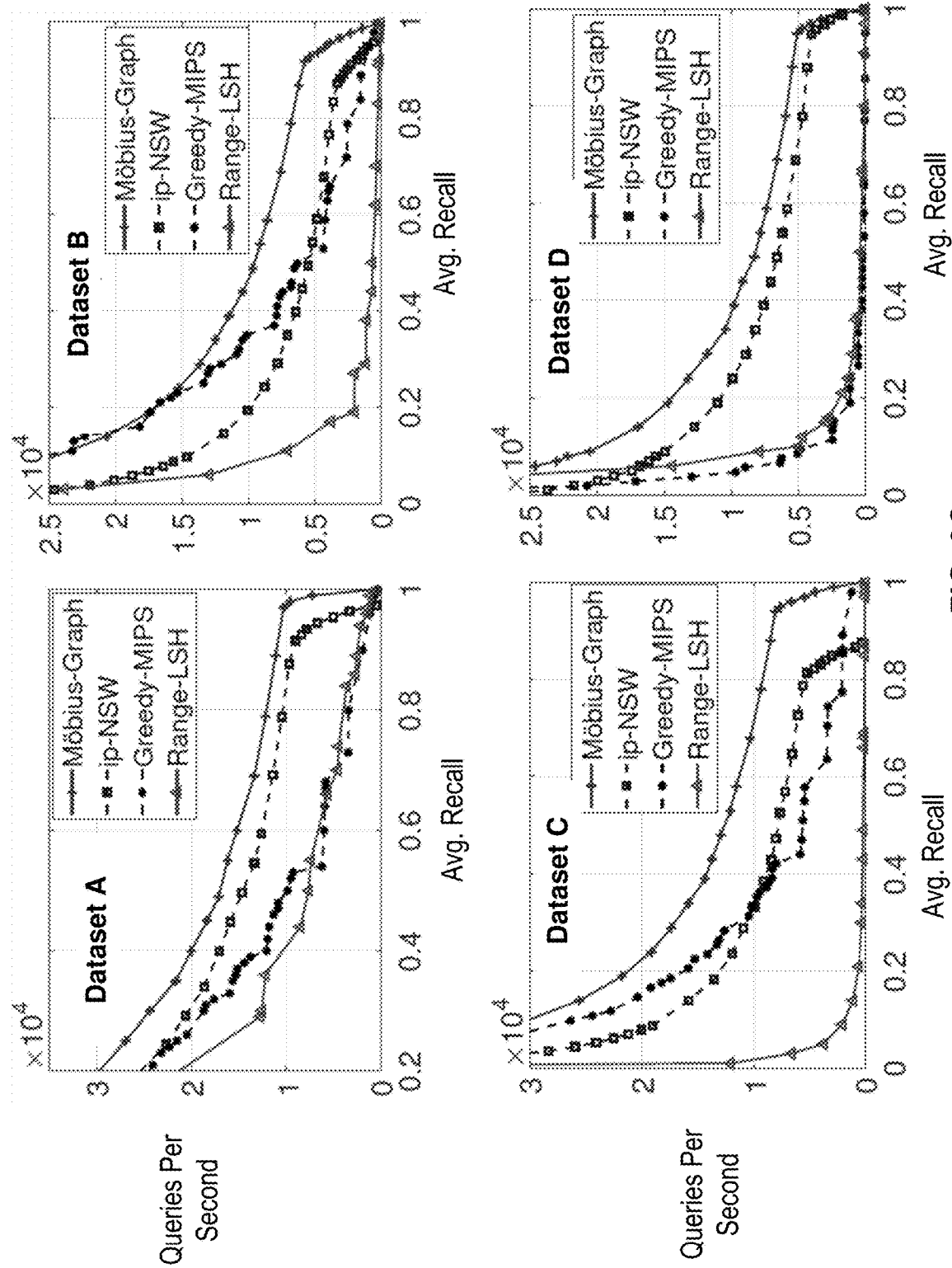

Experimental results for Recall vs. Queries Per Second (QPS) are shown in FIG. 8A-C. Each column corresponds to one dataset and figures in each row are results for top-1, top-10 and top-100 labels, respectively. As can be seen, the Möbius-Graph embodiment works much better than previous state-of-the-art methods in most of the cases on all datasets.

An interesting fact is the effect of the extreme points percentage across different datasets. The Möbius-Graph embodiment is motivated by the typical phenomenon in which a dataset has a low percentage of extreme points. As a result, the constructed approximate Delaunay graph would be efficient for maximum inner product retrieval. Nevertheless, it can be seen that the proposed embodiments work very well for datasets with a high percentage of extreme points—such as Dataset A, which has more than 45% extreme points and Dataset D, which has more than 30% extreme points. Results are shown for different ground truth label sets, which show that the tested embodiment works well in various cases, not only for the top-1 label but also for the top-10 and top-100 labels. These results demonstrate the robustness of the Möbius-Graph embodiments in MIPS.

Conversely, it is difficult to tell which baseline works better than others across all datasets. Range-LSH works relatively well on Dataset A but much worse than other methods on the other three datasets. The baseline ip-NSW works well on datasets with high extreme points percentages (e.g., Datasets A and D) but becomes worse on other datasets. Greedy-MIPS shows priorities over ip-NSW on datasets with low extreme points percentages (e.g., Datasets B and C) at some recall levels.

Figure 9:
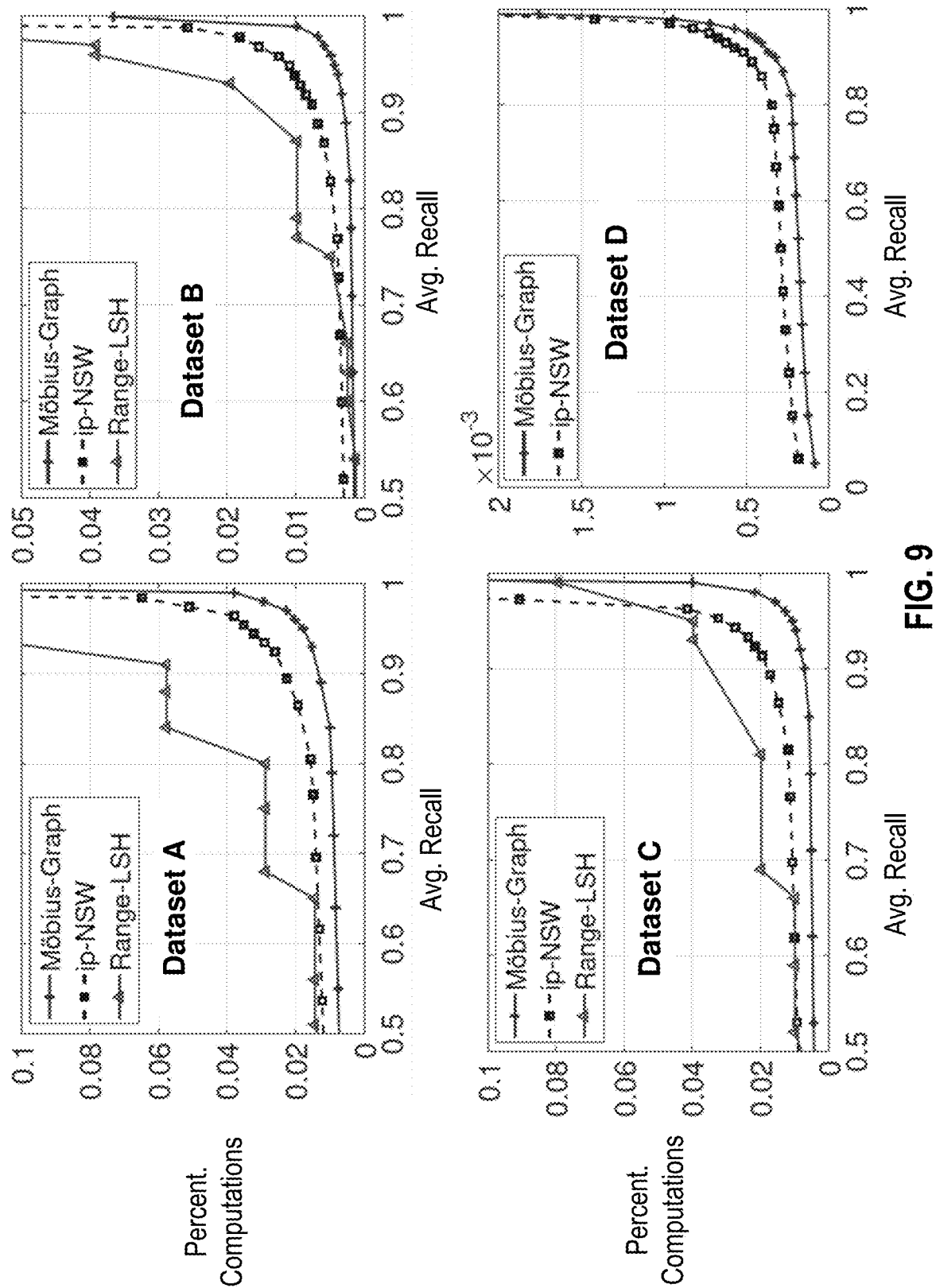
FIG. 9 depicts experimental results for Recall vs. Percentage of Computations on different datasets, according to embodiments of the present disclosure. Best results are in the lower right corners.

Results for Recall vs. Percentage of Computations are shown in FIG. 9. Only top-10 results are shown due to the limited space. Top-1 and top-100 results can be found in the Appendix. Note that this measurement may not be meaningful for Greedy-MIPS. Results for Recall vs. Percentage of Computations are shown in FIG. 9. In this view, the Möbius-Graph embodiment works best in all cases. Range-LSH works comparably with others on smaller datasets (i.e., the first three) in this view. Recall vs. Percentage of Computations does not consider the cost of different index structures. Although Range-LSH works well in this view, its overall time cost is much higher than others as shown in FIG. 8A-C. The possible reason is that the table-based index used in Range-LSH is not that efficient in searching. Besides, Range-LSH works badly on Dataset D, which is much larger. The curve for Range-LSH cannot be shown in the scope of Dataset D.

Besides, the graph construction time cost by ip-NSW and the Möbius-Graph embodiment is represented in Table 2. As can be seen, the Möbius-Graph embodiment consumes 13.7% to 65.5% less time in index construction than ip-NSW, which brings great benefits for real applications. A reason is that metric measure (i.e., $\ell_2$) based searching (in the graph construction) is more efficient than inner product-based searching.

TABLE 2

Graph Construction Time in Seconds.

| | Dataset A | Dataset B | Dataset C | Dataset D |
|---|---|---|---|---|
| ip-NSW | 2.19 | 36.95 | 6.78 | 396.82 |
| Möbius-Graph | 1.89 | 24.35 | 2.34 | 162.24 |
| | (−13.7%) | (−34.1%) | (−65.5%) | (−59.1%) |

3. Implementation by SONG

Figure 10:
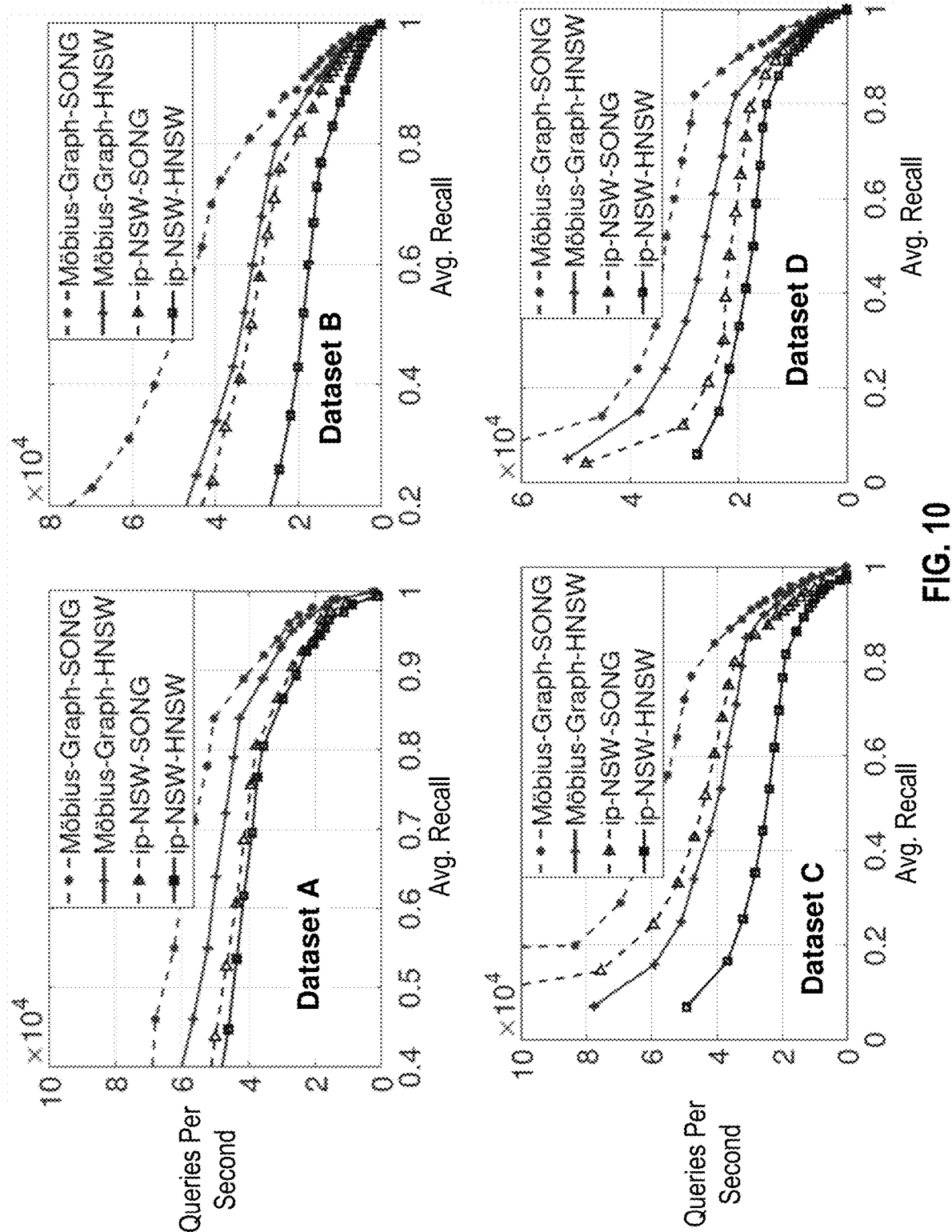
FIG. 10 depicts comparison of two implementations, HNSW and SONG, on a Mobius-Graph embodiment and ip-NSW, according to embodiments of the present disclosure.

To exclude bias from implementation, an Möbius-Graph embodiment and an ip-NSW implementation were implemented by another search on graph platform, a SONG embodiment. The results are shown in FIG. 10. As can be seen, the implementation of SONG is more efficient than HNSW, both for Möbius-Graph and ip-NSW, but their priority order keeps the same. The Möbius-Graph embodiment works better than ip-NSW under both implementations.

F. Some Conclusions

Maximum Inner Product Search (MIPS) is a challenging problem with wide applications in search and machine learning. In this patent document, embodiments of a novel search on the graph method for MIPS were presented. In the view of computational geometry, it was shown that under Möbius/Möbius-like transformation, an isomorphism exists between Delaunay graph for inner product and $\ell^2$-norm. Based on this observation, embodiments of a graph indexing methodology that converts subgraph of $\ell^2$-Delaunay graph into IP-Delaunay graph were presented. MIPS via greedy search may then be performed on the transformed graph. It was demonstrated that embodiments provide an effective and efficient solution for MIPS.

Embodiments herein focus on fast search under the non-metric measure, inner product. Beyond inner product, more complicated measures have been studied, such as Bregman divergence, max-kernel, and even more generic measures. It should be noted that embodiments herein may be extended to these measures. Furthermore, a GPU-based system for fast ANN search and MIPS, which has been shown highly effective for generic ANN tasks, may also be adopted in conjunction with the embodiments or adaptations thereof.

G. Appendix

1. Search on Delaunay Graph

Greedy search on Delaunay graph is sufficient and necessary for achieving the global optimum in ANN search. The sufficiency is generalized to a larger class of $f$. First consider a general optimization problem. Let $X \subset \mathbb{R}^d$, we consider a data set $S = \{x_1, \ldots, x_n\} \subset X$ and aim to solve the optimization problem, for $q \in X$, $$\operatorname*{argmax}_{x_i \in S} f(x_i, q) \text{ where } f: X \times X \to \mathbb{R}. \quad (4)$$

Assuming $f$ is continuous, one obtains the following theorem.

Theorem 2:

For given $f$, we assume for any dataset S, each the Voronoi cell $R_i$ is a connected. Let $G = (S, E)$ be the Delaunay graph w.r.t. the Voronoi cells. Then for any $q \in X$, simple greedy search on Delaunay graph returns the solution of Eq. (4). In other words, let $N(x_i) = \{x_j \in S: \{x_i, x_j\} \in G\}$ be the neighbors of $x_i$ on Delaunay graph. If $x_i$ satisfies:

$$f(x_i, q) \geq \max_{x_j \in N(x_i)} f(x_j, q), \quad (5)$$

then $x_i$ a solution of Eq. (4). Conversely, for any G' does not contain Delaunay graph as a subgraph, there exists a query $q \in Y$ such that greedy search on G' does not always retrieve all global maximum.

By the assumption on $f$, we have $$\tilde{R}_i = \bigcap_{x \in N(x_i)} \{q \in X: f(x_i, q) \geq f(x_j, q)\}$$

is connected and $R_i \cup \{q\} \subset \tilde{R}_i$. Hence, we can define a path c: $[0,1] \to \mathbb{R}^k$ such that $c(0) \in R_i$ and $c(1) = q$. For every $x_j \in S$, $f(x_j, c(0)) \leq f(x_i, c(0))$. If $f(x_j, c(1)) \geq f(x_i, c(1))$, then by intermediate value theorem, there exists $t \in [0,1]$ such that $f(x_j, c(t)) = f(x_i, c(t))$. Hence $R_i \cap R_j \neq \emptyset$, and $x_j$ is a neighbor of $x_i$ on G. In this case, by Eq. (5), we have $f(x_i, q) = f(x_j, q)$. Therefore, for $x_j \in S$, we have $f(x_i, q) \geq f(x_j, q)$.

Conversely, suppose G' misses an edge in Delaunay graph, then there exists $x_i$ and $x_j$ such that $R_i \cap R_j \neq \emptyset$, but $x_j \notin N(x_i)$. Suppose the query $q \in R_i \cap R_j$ and the initial point is $x_i$, then both $x_i$ and $x_j$ are global maximum of $f(\bullet, q)$. $x_j$ is not a neighbor of $x_i$, but $x_i$ is a global maximum, so greedy search stops at this step. Thus, $x_j$ cannot be discovered as a global maximum.

2. Additional Comments on Assumption 1

Assumption 1 eases the arguments in Section C. For better understanding of Assumption 1, we develop the following equivalent expressions.

Proposition 3:

The following are equivalent:

S satisfies Eq. (A1).

The convex hull of S contains 0 as an interior point.

For every $a \in \mathbb{R}^d \setminus \{0\}$, there exists $x \in S$ such that $x^\tau a > 0$.

(a)$\Rightarrow$(b). Suppose 0 is not an interior point of Conv(S), then there exists a closed half-space H with a boundary point 0 contains S. H is a convex cone, so coni(S) $\subset$ H $\subsetneq \mathbb{R}^d$.

(b)$\Rightarrow$(c). For every $a \in \mathbb{R}^d \setminus \{0\}$, there exists $\beta > 0$ such that $\beta a \in \text{Conv}(S)$. Hence $\beta a = \sum_{i=1}^n \alpha_i x_i$ for some $\alpha_i \geq 0$. Then $0 < \beta a^\tau a = \beta a^\tau \sum_{i=1}^n \alpha_i x_i = \beta \sum_{i=1}^n \alpha_i x_i^\tau a$, so there exists $x \in S$ such that $x^\tau a > 0$.

(c)$\Rightarrow$(a). Suppose coni(S) $\neq \mathbb{R}^d$, then coni(S) $\subset$ H for some closed half-space H. For a $\in$ H such that it is perpendicular to the boundary H, there does not exists $x \in S$ such that $x^\tau a > 0$.

Suppose Assumption 1 is not satisfied, the MIPS problem is still interesting. This situation is discussed in the following two cases.

Case 1.

If Assumption 1 is not true, but the queries always locate in the conical hull of the dataset S, then the approach is still valid because, for every query, the correct solution of MIPS problem is still a neighbor of 0 after Möbius/Möbius-like transformation.

Case 2.

Suppose Assumption 1 is not true, and queries can be any points in the Euclidean space, then the approach may not work. However, the graph construction methodology may be changed slightly as follows. We find the center of the dataset, say c, then we apply the transformation:

$$g(x) = \frac{x - c}{\|x\|^2}$$

to every data point to obtain $\tilde{S}$ (although the denominator may be $\|x\|^n$ where $n > 1$). It should be noted that such g(x) is still a Möbius/Möbius-like transformation since it is of the form in Eq. (3). It is not difficult to check the isomorphism between IP-Delaunay graph and the subgraph of $\ell^2$-Delaunay graph introduced in Corollary 1. However, this method may be suggested in this special case. Centering the data points changes all the norms, while the length of the vector decides the chance of being returned in MIPS problem.

3. Proof of Theorem 1

(a)⇒(b). By Definition 1, the Voronoi cell $R_i$ w.r.t. inner product and $x_i$ is $$R_i = \{q \neq 0: x_i^\tau q \geq x_k^\tau q \text{ for } k \in [n]\}.$$

Similarly, $$R_j = \{q \neq 0: x_j^\tau q \geq x_k^\tau q \text{ for } k \in [n]\}.$$

By Definition 2, (a) implies there exists $a \in R_i \cap R_j$. a also satisfies $$x_i^T a = x_j^T a \geq \max_{x \in S} x^T a > 0.$$

(b)⇒(a). If a satisfies statement (b), then $a \in R_i \cap R_j$, which implies (a) by Definition 2.

(b)⇒(c). Firstly, notice that $x_i = y_i / \|y_i\|^2$, then let $b = x_i^\tau a$ and $$c = \frac{a}{2b}.$$

Note that b>0 by Proposition 3 (c). Then, we have $$y_i^T c = \frac{y_i^T a}{2 x_i^T a} = \frac{y_i^T a \|y_i\|^2}{2 y_i^T a} = \frac{1}{2} \|y_i\|^2.$$

Hence, $\|y_i - c\|^2 = \|y_i\|^2 - 2 y_i^\tau c + \|c\|^2 = \|y_i\|^2 - \|y_i\|^2 + \|c\|^2 = \|c\|^2$. Using Eq. (A1), we have $x_i^\tau a \geq \max_{x \in S} x^\tau a > 0$, so for $x \in S$ and $y = x / \|x\|^2 \in S'$, $$y^T c = \frac{y^T a}{2 x_i^T a} = \frac{y_j^T a \|y_j\|^2}{2 x^T a} \leq \frac{1}{2} \|y_j\|^2.$$

Therefore, $\|y - c\|^2 = \|y\|^2 - 2 y^\tau c + \|c\|^2 \leq \|y\|^2 - \|y\|^2 + \|c\|^2 = \|c\|^2$. Since this is true for all $x \in S$, we have $\|c\| \leq \min_{y \in S'} \|y - c\|$. Since $x_i^\tau a = x_j^\tau a$, we can repeat the arguments for $x_j$ to obtain statement (c).

(c)⇒(b). This can be proved by observing that every step of the proof of (b) ⇒(c) is invertible.

(c)⇔(d). This is due to empty sphere criterion. See Proposition 2.

4. Additional Empirical Experiments

Figure 11A:
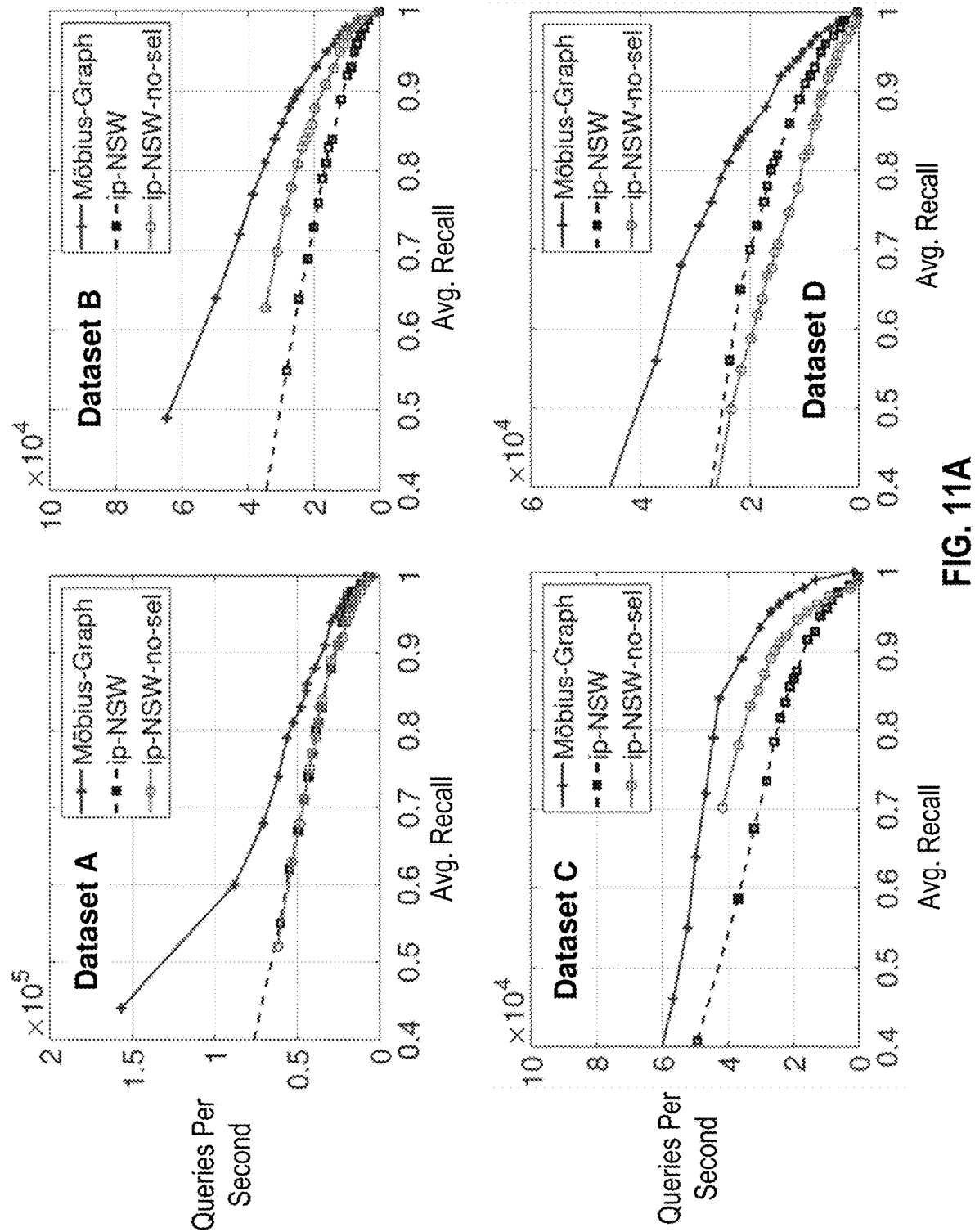
FIG. 11A-C depicts experimental results for Möbius-Graph, ip-NSW with and without edge selection, according to embodiments of the present disclosure.
Figure 11B:
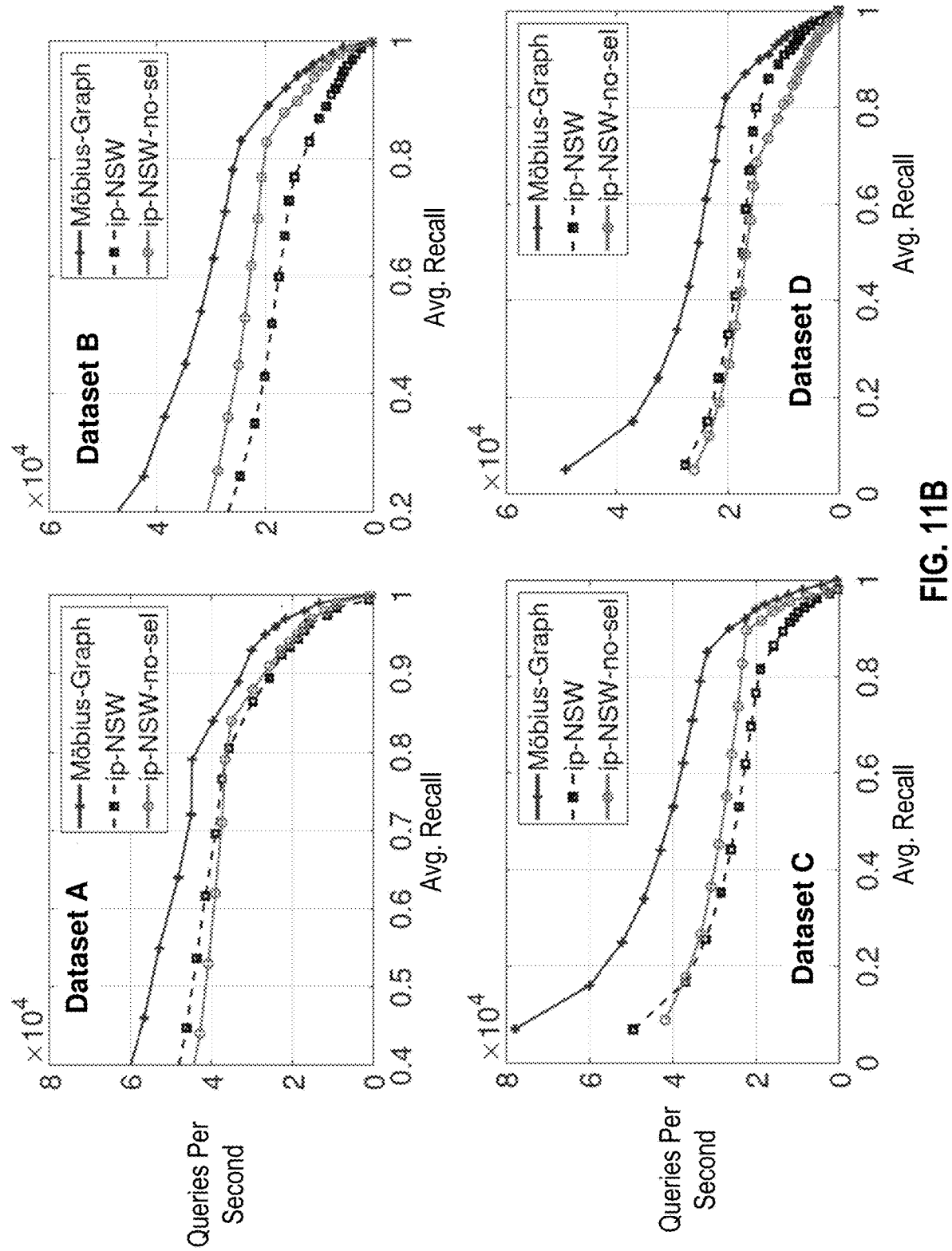
Figure 11C:
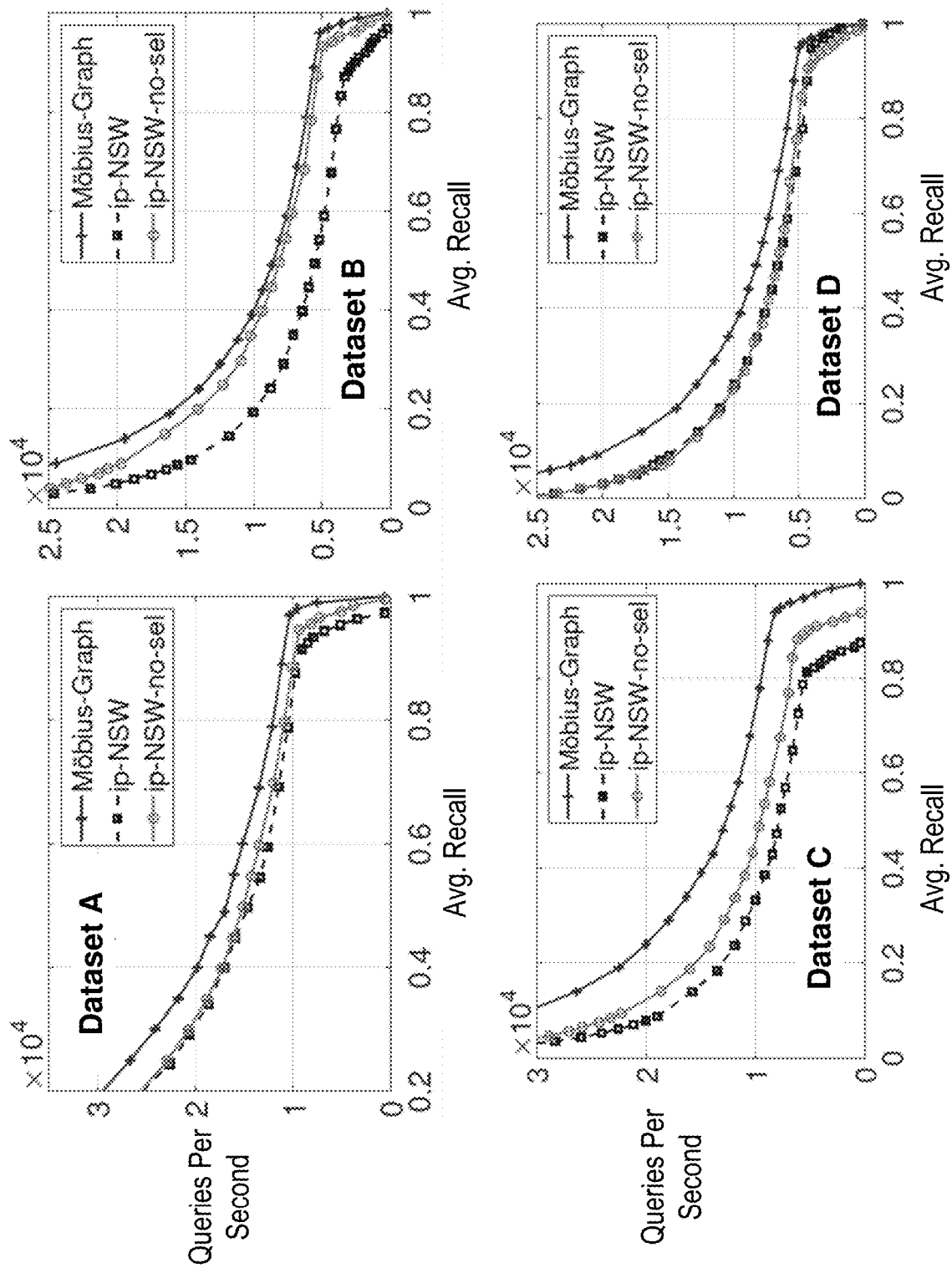

In the Morozov and Babenko article (referred above), it was claimed that their algorithm can adopt any graph construction algorithm, including NSW and HNSW. For the sake of fairness, a Möbius-Graph embodiment was compared with different versions of ip-NSW. Edge selection is a contribution of HNSW. However, there is no guarantee for its applicability on non-metric measure. We compared the MIPS efficiency of ip-NSW with and without edge selection step and found an interesting observation. FIGS. 11A-C shows that, for Datasets B and C, edge selection results in poor performance, while the effect is not obvious on the other two datasets. It is possible that edge selection is not helpful when the proportion of extreme points is small.

Figure 12A:
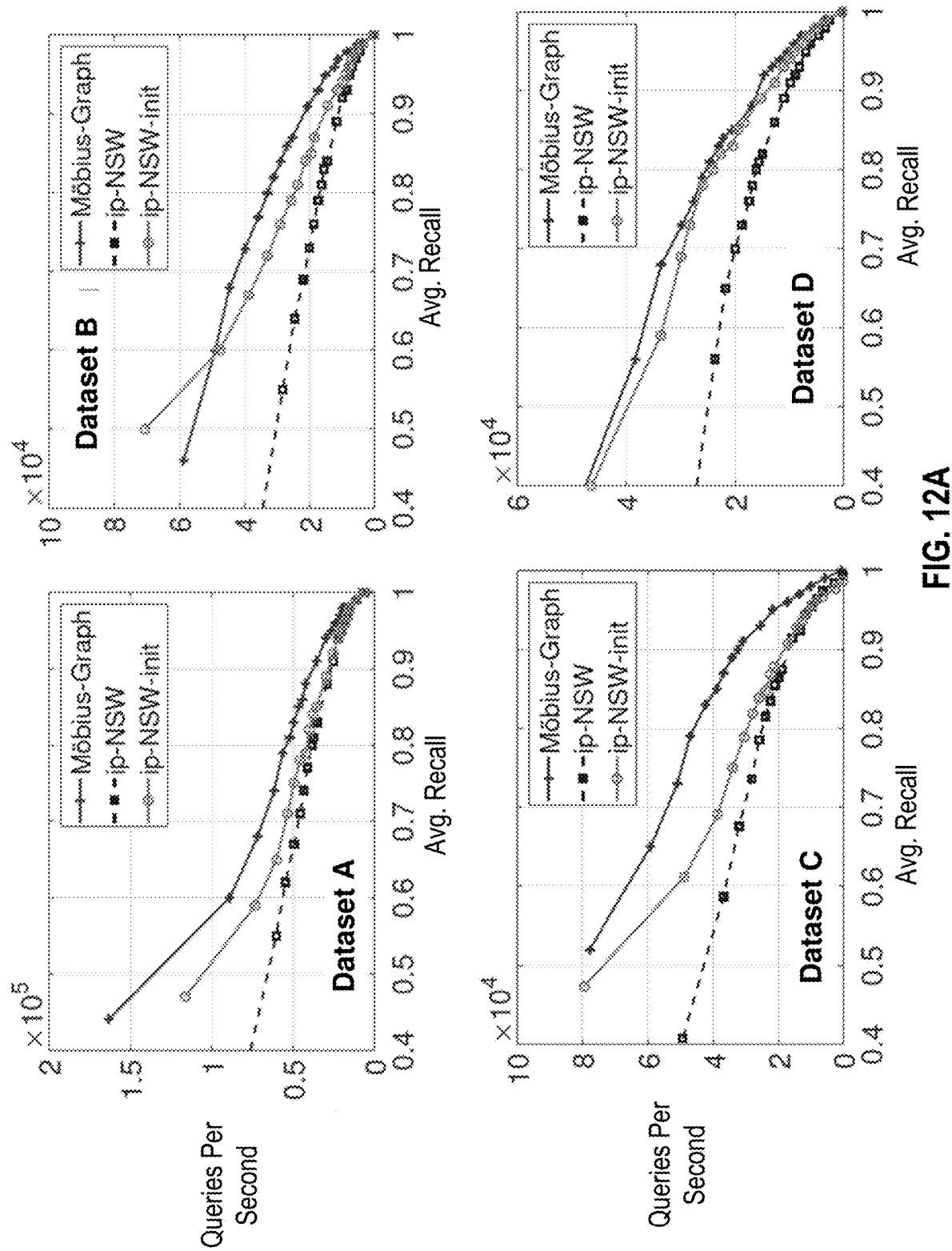
FIG. 12A-C depicts experimental results for a Möbius graph embodiment, ip-NSW using random initial points, and ip-NSW using initial points from Möbius graph, according to embodiments of the present disclosure.
Figure 12B:
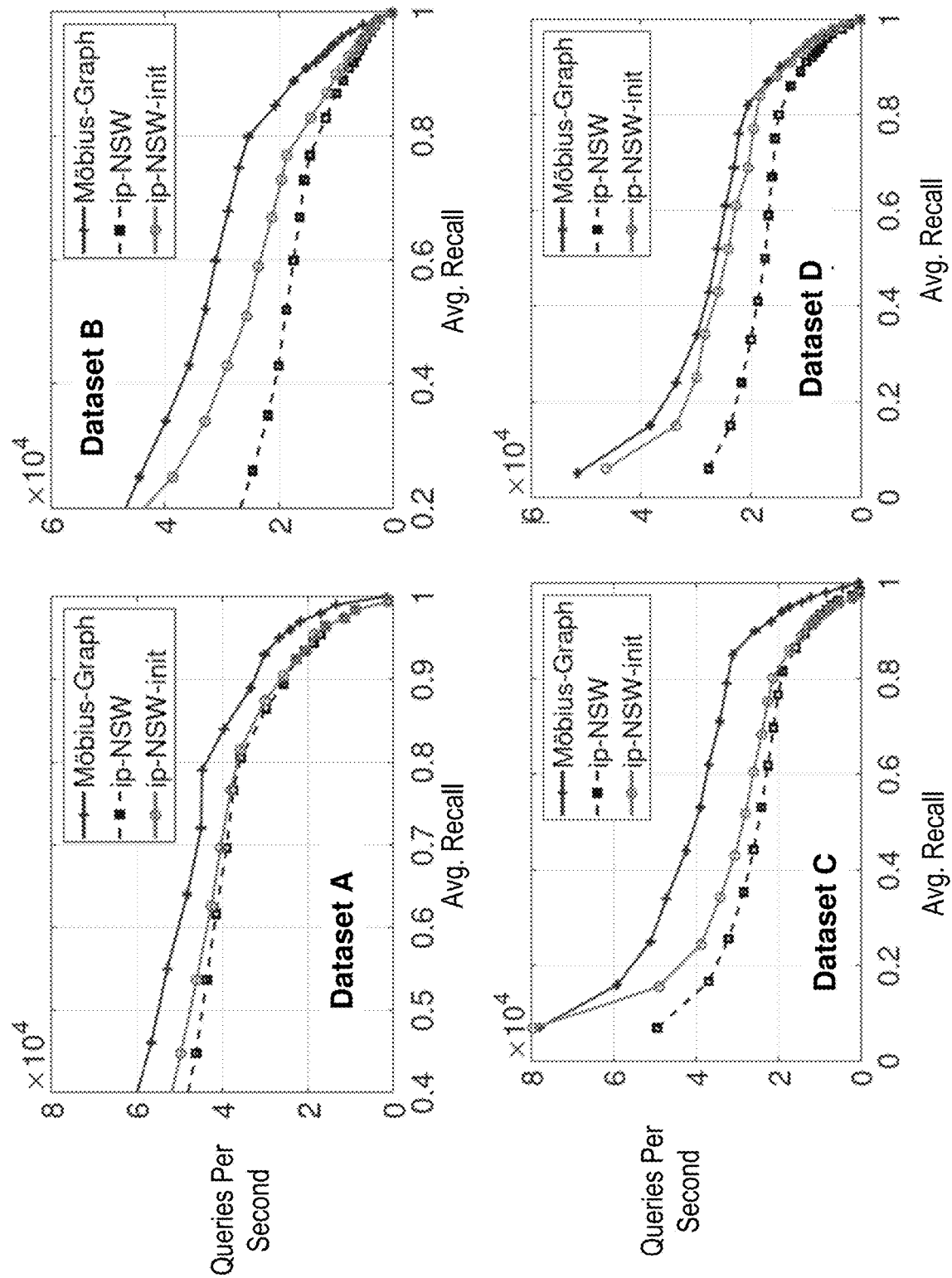
Figure 12C:
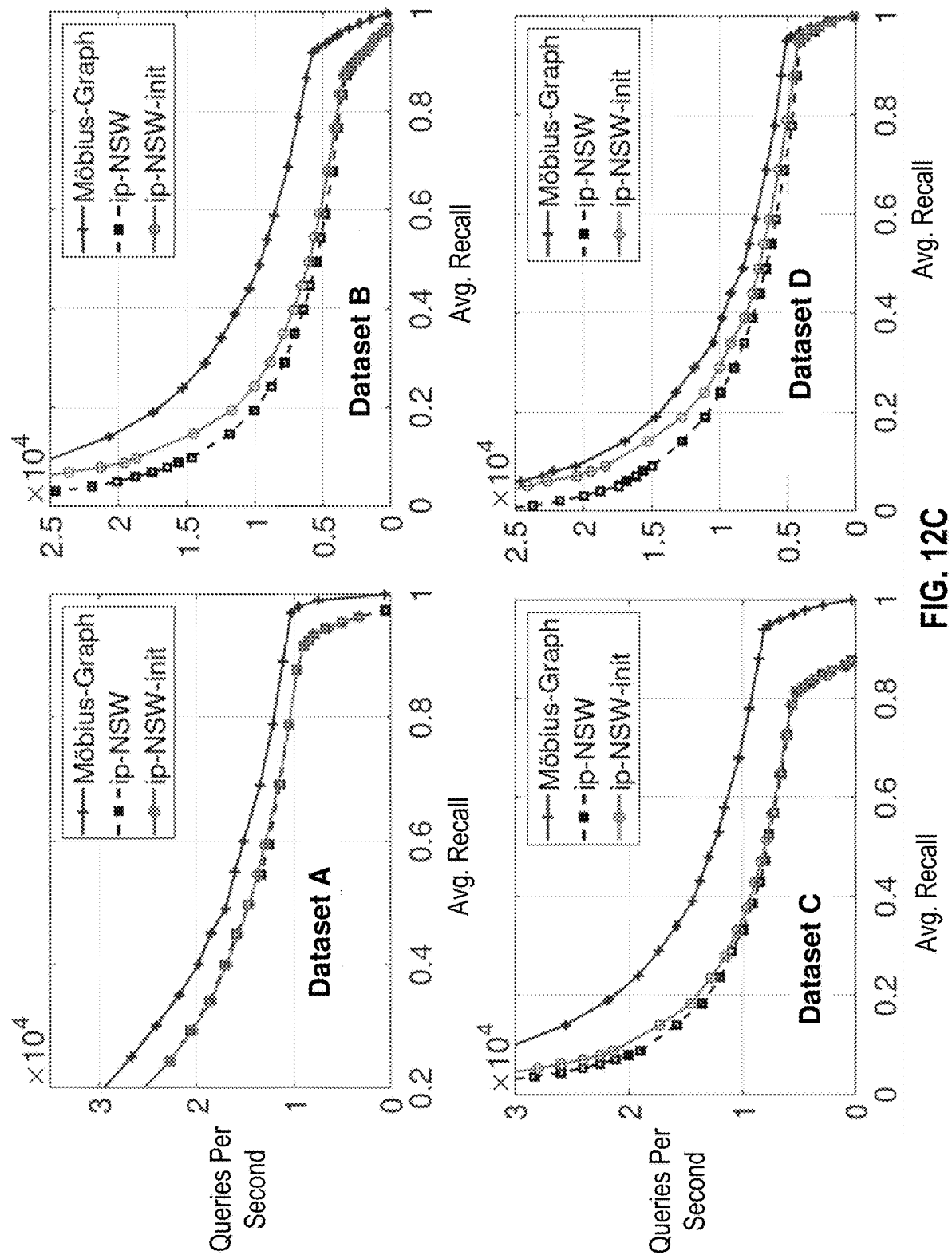
Figure 13A:
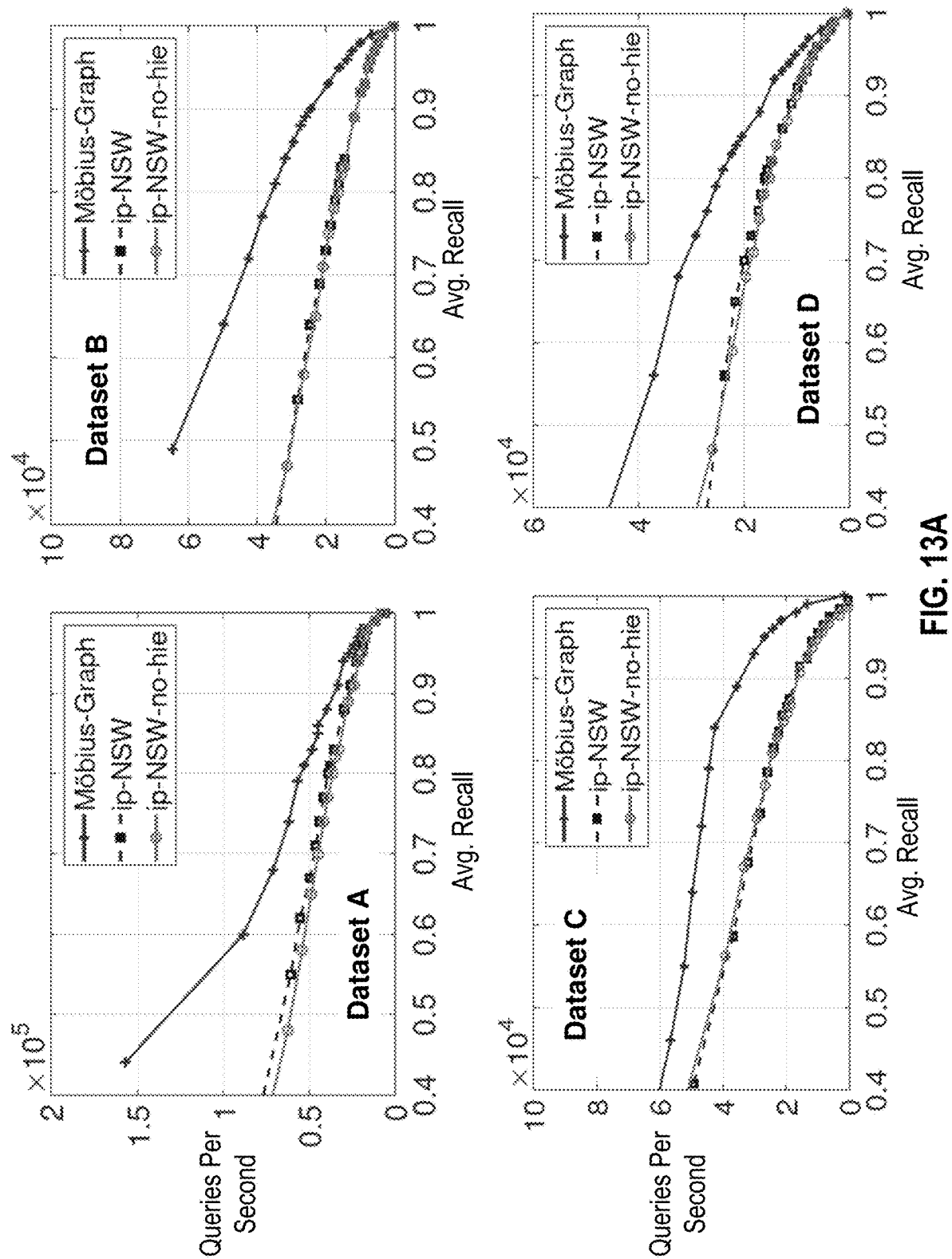
FIG. 13A-C depicts experimental results for a Möbius graph embodiment and ip-NSW with and without hierarchical structure, according to embodiments of the present disclosure.
Figure 13B:
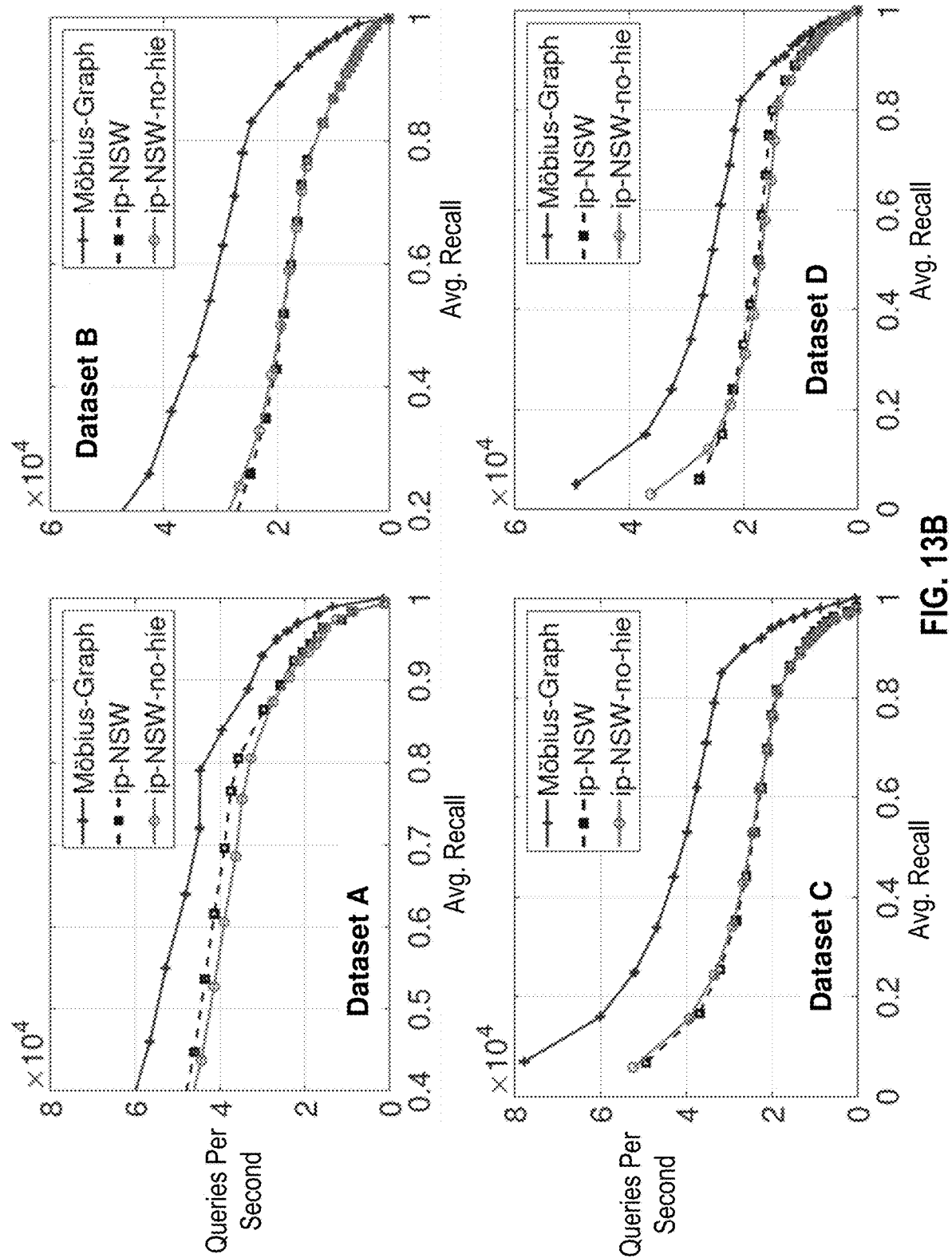
Figure 13C:
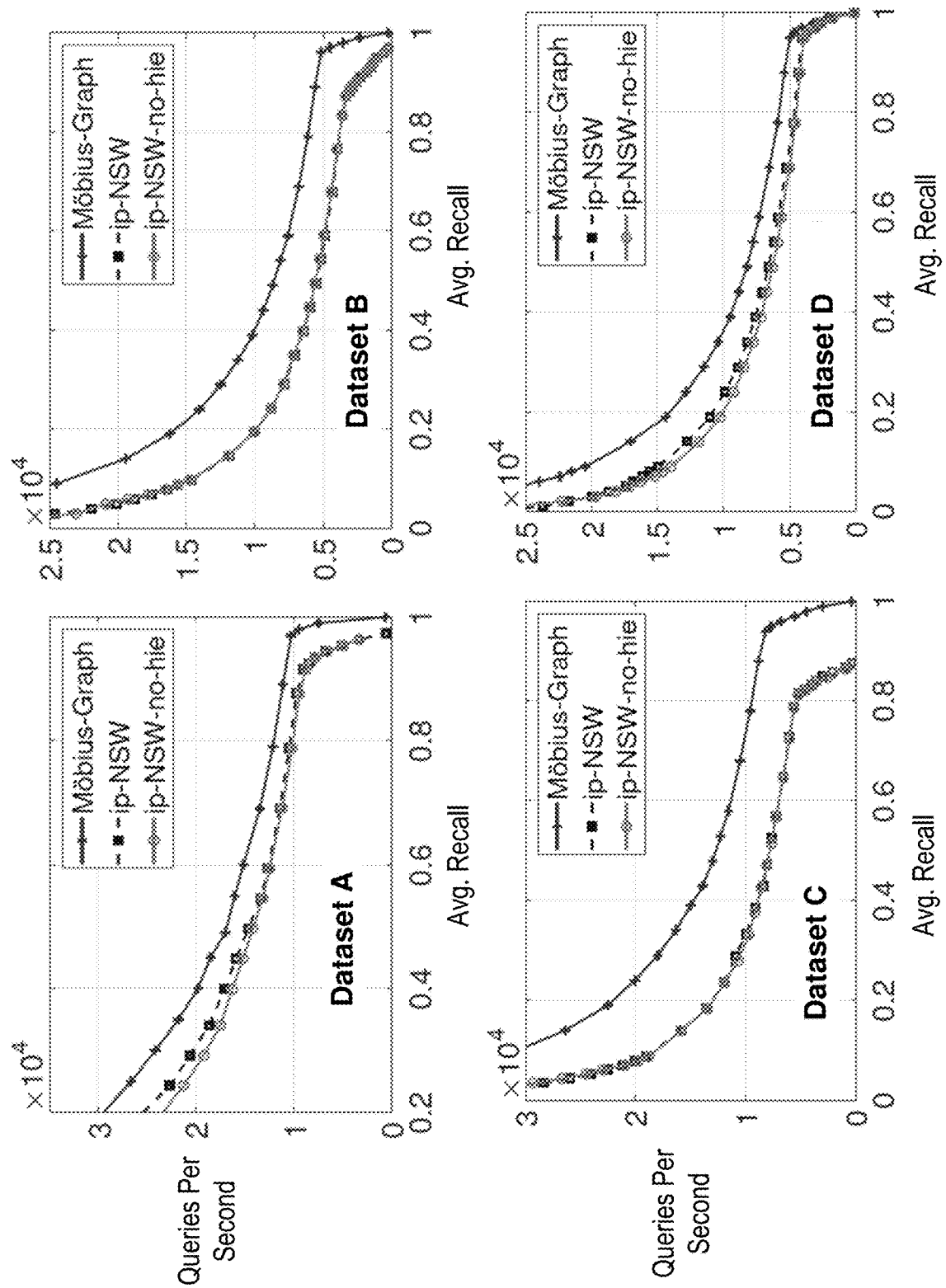

The hierarchical graph structure in HNSW is to perform multi-scale hopping. Our tested Möbius-Graph embodiment can find good starting points, so it would be interesting to see whether ip-NSW can work well by starting points found by the Möbius-Graph embodiment. Here we designed one variant for ip-NSW, ip-NSW-init, which gives up the hierarchical index structure but exploits starting points found by the Möbius-Graph embodiment. For each query, we exploited the Möbius-Graph embodiment to find a start point by conducting one step greedy search. This step is done offline and the time cost will not be counted as that of ip-NSW-init. The results are represented in FIGS. 12A-C. If ip-NSW starts searching from initial points found by the Möbius-Graph embodiment, its performance can be significantly improved in top-1 inner product search. However, such difference disappears if we consider top-100 results. We also compare the effect of hierarchical graph structure on the performance of ip-NSW. As can be seen in FIG. 13A-C, its impact is very little.

Figure 14A:
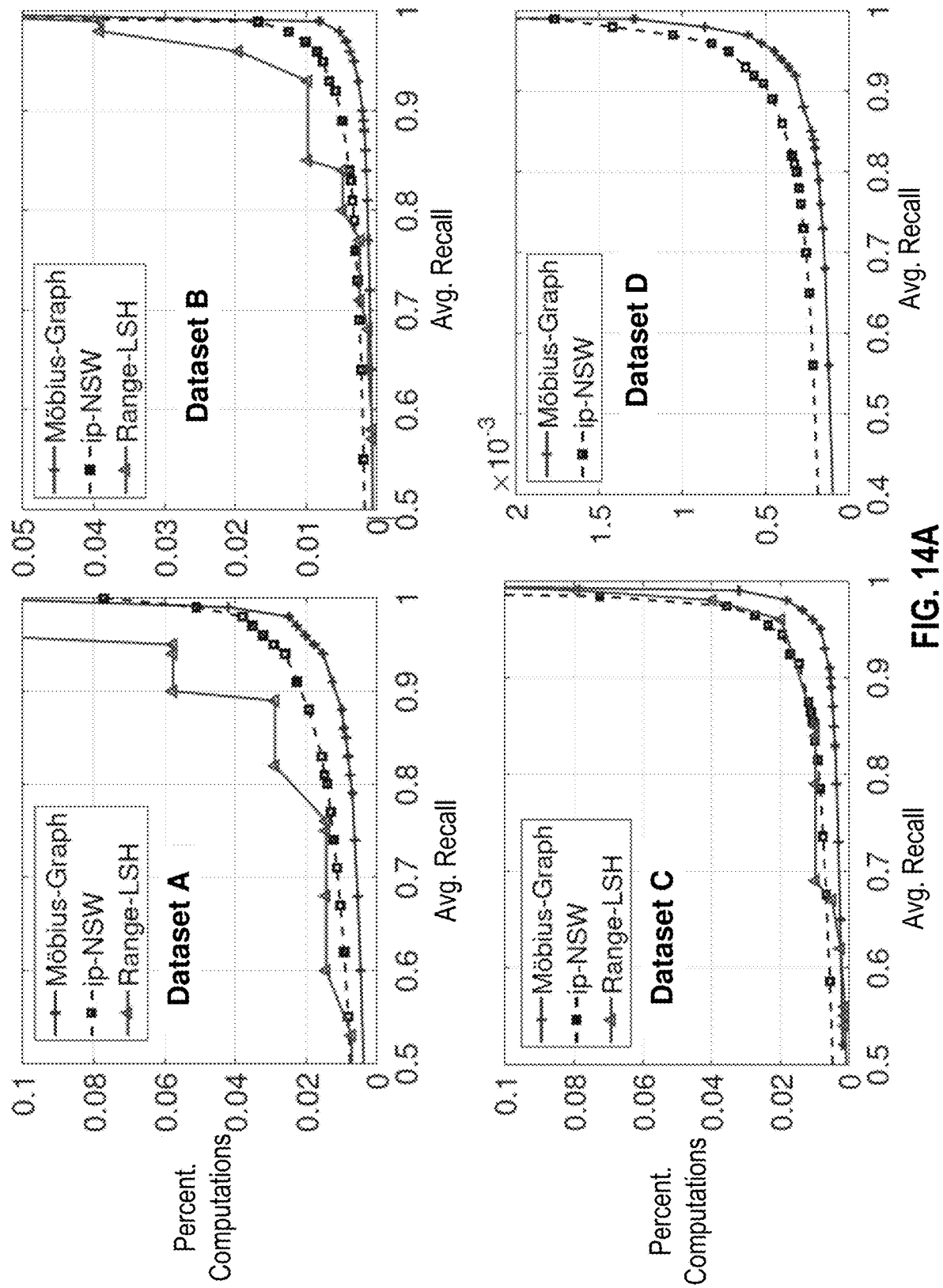
FIG. 14A-B depicts experimental results for Recall vs. Percentage of Computations, according to embodiments of the present disclosure.
Figure 14B:
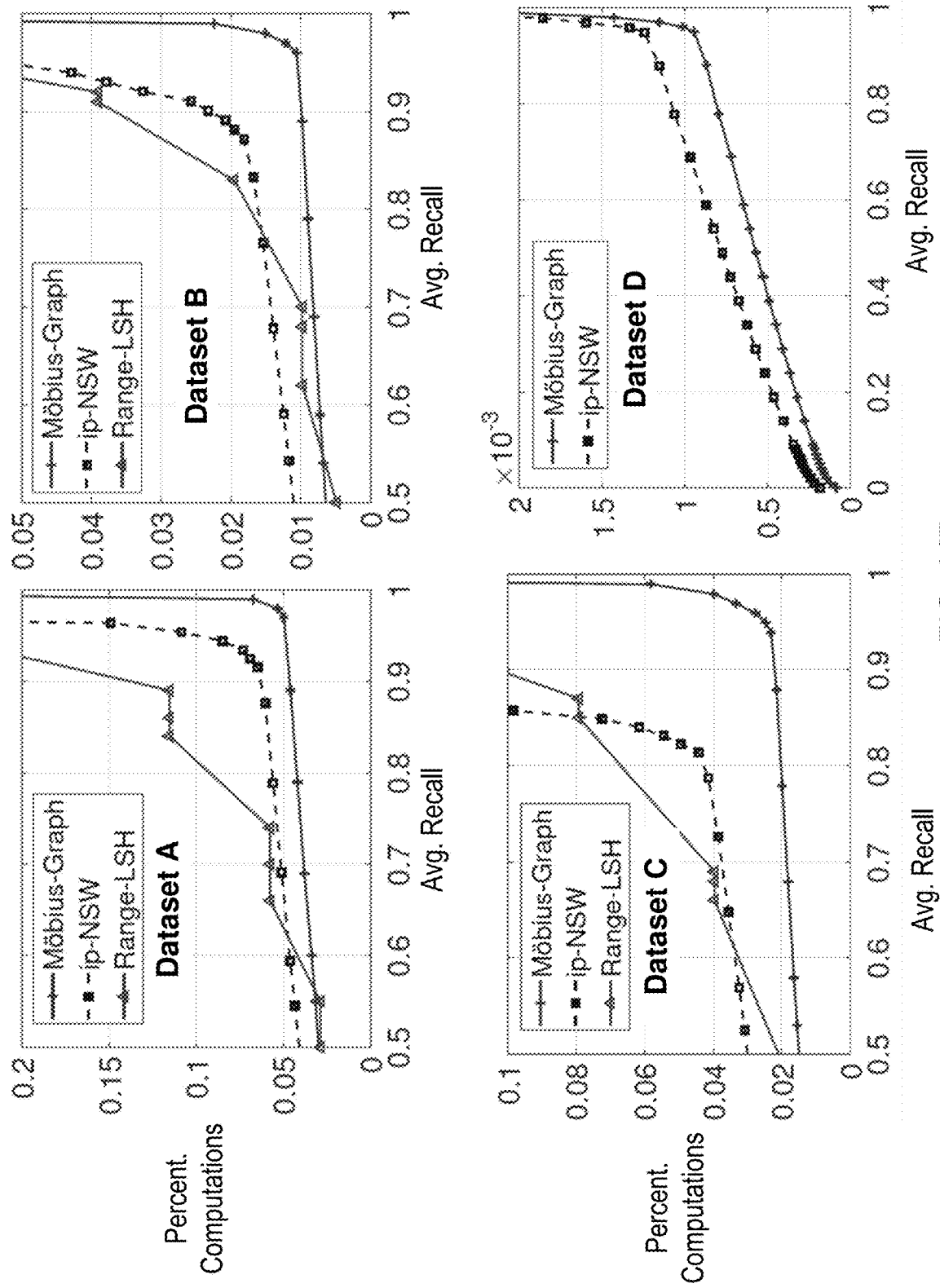

FIG. 14A-B completes the experimental results of FIG. 9 in Section E. FIG. 14A-B depicts experimental results for Recall vs. Percentage of Computations, according to embodiments of the present disclosure. Shown are the remaining results for top-1 and top-100 labels. The curves for Range-LSH on Dataset D are out of the showing scopes.

H. Computing System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more disk drives, one or more network ports for communicating with external devices as well as various input and output (I/O) devices, such as a keyboard, mouse, stylus, touchscreen and/or video display. The computing system may also include one or more buses operable to transmit communications between the various hardware components.

Figure 15:
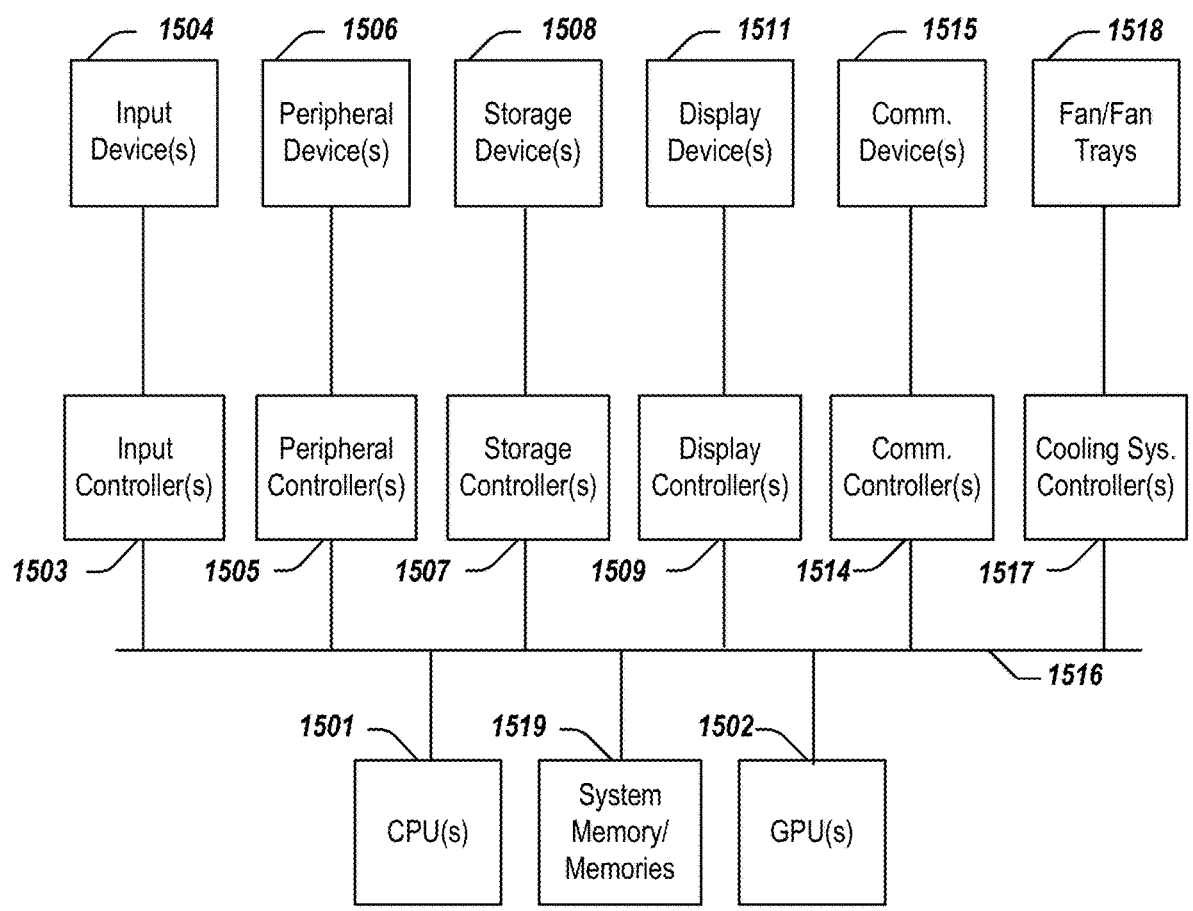
FIG. 15 depicts a simplified block diagram of a computing device/information handling system, in accordance with embodiments of the present disclosure.

FIG. 15 depicts a simplified block diagram of an information handling system (or computing system), according to embodiments of the present disclosure. It will be understood that the functionalities shown for system 1500 may operate to support various embodiments of a computing system—although it shall be understood that a computing system may be differently configured and include different components, including having fewer or more components as depicted in FIG. 15.

As illustrated in FIG. 15, the computing system 1500 includes one or more central processing units (CPU) 1501 that provides computing resources and controls the computer. CPU 1501 may be implemented with a microprocessor or the like, and may also include one or more graphics processing units (GPU) 1502 and/or a floating-point coprocessor for mathematical computations. In one or more embodiments, one or more GPUs 1502 may be incorporated within the display controller 1509, such as part of a graphics card or cards. Thy The system 1500 may also include a system memory 1519, which may comprise RAM, ROM, or both.

A number of controllers and peripheral devices may also be provided, as shown in FIG. 15. An input controller 1503 represents an interface to various input device(s) 1504, such as a keyboard, mouse, touchscreen, and/or stylus. The computing system 1500 may also include a storage controller 1507 for interfacing with one or more storage devices 1508 each of which includes a storage medium such as magnetic tape or disk, or an optical medium that might be used to record programs of instructions for operating systems, utilities, and applications, which may include embodiments of programs that implement various aspects of the present disclosure. Storage device(s) 1508 may also be used to store processed data or data to be processed in accordance with the disclosure. The system 1500 may also include a display controller 1509 for providing an interface to a display device 1511, which may be a cathode ray tube (CRT) display, a thin film transistor (TFT) display, organic light-emitting diode, electroluminescent panel, plasma panel, or any other type of display. The computing system 1500 may also include one or more peripheral controllers or interfaces 1505 for one or more peripherals 1506. Examples of peripherals may include one or more printers, scanners, input devices, output devices, sensors, and the like. A communications controller 1514 may interface with one or more communication devices 1515, which enables the system 1500 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 1500 comprises one or more fans or fan trays 1518 and a cooling subsystem controller or controllers 1517 that monitors thermal temperature(s) of the system 1500 (or components thereof) and operates the fans/fan trays 1518 to help regulate the temperature.

In the illustrated system, all major system components may connect to a bus 1516, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as compact disc (CD) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as a CD and holographic devices; magneto-optical media; and hardware devices that are specially configured to store or to store and execute program code, such as ASICs, programmable logic devices (PLDs), flash memory devices, other non-volatile memory (NVM) devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method comprising:
receiving a query; and
searching a final graph using inner product to identify a set of one or more data elements relevant to the query, in which the final graph was formed by performing steps comprising:
forming a transformed dataset by performing a transformation on a dataset comprising original data elements and by adding an origin element to the transformed dataset;
constructing a proximity graph of the transformed dataset using $\ell^2$ distance, in which at least some of the data elements of the transformed dataset are vertices in the proximity graph and connections between vertices in the proximity graph are edges;
identifying a set of neighbors of the origin element on the proximity graph;
removing the origin element and its edges from the proximity graph; and
obtaining the final graph by replacing the vertices in the proximity graph, which comprises data elements from the transformed dataset, with corresponding original data elements.

2. The computer-implemented method of claim 1 wherein the transformation is a Möbius transformation.

3. The computer-implemented method of claim 1 further comprising:
outputting at least one of the data elements from the set of one or more data elements for the query or information corresponding to at least one of the data elements from the set of one or more data elements for the query.

4. The computer-implemented method of claim 1 wherein the search on the final graph is a greedy search.

5. The computer-implemented method of claim 1 wherein the step of constructing a proximity graph of the transformed dataset using $\ell^2$ distance, in which at least some of the data elements of the transformed dataset are vertices in the proximity graph and connections between vertices in the proximity graph are edges comprises:
initializing the proximity graph using at least some of the transformed data elements as vertices;
while not all of the transformed data element been processed, performing step comprising:
selecting a transformed data element that is not currently a vertex in the proximity graph;
using a greedy search and $\ell^2$ distance as a measure to identify a set of candidate neighbors;
selecting from the set of candidate neighbors a set of closest neighbors based upon $\ell^2$ distance;
adding edges to the proximity graph from the selected transformed element to each neighbor in the set of closest neighbors; and
for each neighbor in the set of closest neighbors, updating the set of its closest neighbors; and
outputting the proximity graph comprising transformed data elements.

6. The computer-implemented method of claim 5 further comprising:
outputting a set of neighbors of the origin element comprising transformed data elements;
replacing the transformed data elements in the set of neighbors with corresponding original data elements to form a set of enter data elements; and
outputting the set of enter data elements.

7. The computer-implemented method of claim 6 further comprising:
given a query data element, a set of enter data elements, the final graph comprising vertices and edges, and a number of candidates to return k:
initializing a set of data elements of a priority queue with the set of enter data elements;
marking the vertices of the final graph that are members of the set of enter data elements as checked and marking a remainder of the vertices of the final graph as unchecked;
responsive to a number of data elements in the priority queue being greater than the number of candidates to return, setting the priority queue as the top-k data elements in descending order of inner product measured relative to the query data element;
while there exists a data element in the final graph that is unchecked and the priority queue keeps updating, performing steps comprising:
updating the priority queue as a union of the existing priority queue and an unchecked data element in the final graph that forms an edge in the final graph with a data element that is in the existing priority queue;
marking data elements in the updated priority queue as checked; and
responsive to the number of data elements in the priority queue being greater than the number of candidates to return, setting the priority queue as the top-k elements in descending order of inner product measured relative to the query data element; and
outputting a final priority queue.

8. A non-transitory computer-readable medium or media storing one or more sequences of instructions which, when executed by at least one processor, causes steps to be performed comprising:
receiving a query; and
identifying a set of one or more data elements relevant to the query by performing a search on a final graph using inner product, in which the final graph was formed by performing steps comprising:
forming a transformed dataset by performing a transformation on a dataset comprising original data elements and by adding an origin element to the transformed dataset;
constructing a proximity graph of the transformed dataset using $\ell^2$ distance, in which at least some of the data elements of the transformed dataset are vertices in the proximity graph and connections between vertices in the proximity graph are edges;
identifying a set of neighbors of the origin element on the proximity graph;
removing the origin element and its edges from the proximity graph; and
obtaining the final graph by replacing the vertices in the proximity graph, which comprises data elements from the transformed dataset, with corresponding original data elements.

9. The non-transitory computer-readable medium or media of claim 8 wherein the transformation is a Möbius transformation.

10. The non-transitory computer-readable medium or media of claim 8 further comprising one or more sequences of instructions which, when executed by at least one processor, causes steps to be performed comprising:
outputting at least one of the data elements from the set of one or more data elements for the query or information corresponding to at least one of the data elements from the set of one or more data elements for the query.

11. The non-transitory computer-readable medium or media of claim 8 wherein the search on the final graph is a greedy search.

12. The non-transitory computer-readable medium or media of claim 8 wherein the step of constructing a proximity graph of the transformed dataset using $\ell^2$ distance, in which at least some of the data elements of the transformed dataset are vertices in the proximity graph and connections between vertices in the proximity graph are edges comprises:

initializing the proximity graph using at least some of the transformed data elements as vertices;
   while not all of the transformed data element been processed, performing step comprising:
      selecting a transformed data element that is not currently a vertex in the proximity graph;
      using a greedy search and $\ell^2$ distance as a measure to identify a set of candidate neighbors;
      selecting from the set of candidate neighbors a set of closest neighbors based upon $\ell^2$ distance;
      adding edges to the proximity graph from the selected transformed element to each neighbor in the set of closest neighbors; and
      for each neighbor in the set of closest neighbors, updating the set of its closest neighbors; and
   outputting the proximity graph comprising transformed data elements.

13. The non-transitory computer-readable medium or media of claim 12 further comprising one or more sequences of instructions which, when executed by at least one processor, causes steps to be performed comprising:

outputting a set of neighbors of the origin element comprising transformed data elements;
   replacing the transformed data elements in the set of neighbors with corresponding original data elements to form a set of enter data elements; and
   outputting the set of enter data elements.

14. The non-transitory computer-readable medium or media of claim 13 further comprising one or more sequences of instructions which, when executed by at least one processor, causes steps to be performed comprising:

given a query data element, a set of enter data elements, the final graph comprising vertices and edges, and a number of candidates to return k:
      initializing a set of data elements of a priority queue with the set of enter data elements;
      marking the vertices of the final graph that are members of the set of enter data elements as checked and marking a remainder of the vertices of the final graph as unchecked;
      responsive to a number of data elements in the priority queue being greater than the number of candidates to return, setting the priority queue as the top-k data elements in descending order of inner product measured relative to the query data element;
      while there exists a data element in the final graph that is unchecked and the priority queue keeps updating, performing steps comprising:
         updating the priority queue as a union of the existing priority queue and an unchecked data element in the final graph that forms an edge in the final graph with a data element that is in the existing priority queue;
         marking data elements in the updated priority queue as checked; and
      responsive to the number of data elements in the priority queue being greater than the number of candidates to return, setting the priority queue as the top-k elements in descending order of inner product measured relative to the query data element; and
      outputting a final priority queue.

15. A system comprising:
   one or more processors; and
   a non-transitory computer-readable medium or media storing one or more sets of instructions which, when executed by at least one of the one or more processors, causes steps to be performed comprising:
   receiving a query; and
   identifying a set of one or more data elements for the query by performing a search on a final graph using inner product, in which the final graph was formed by performing steps comprising:
      forming a transformed dataset by performing a transformation on a dataset comprising original data elements and by adding an origin element to the transformed dataset;
      constructing a proximity graph of the transformed dataset using $\ell^2$ distance, in which at least some of the data elements of the transformed dataset are vertices in the proximity graph and connections between vertices in the proximity graph are edges;
      identifying a set of neighbors of the origin element on the proximity graph;
      removing the origin element and its edges from the proximity graph; and
      obtaining the final graph by replacing the vertices in the proximity graph, which comprises data elements from the transformed dataset, with corresponding original data elements.

16. The system of claim 15 wherein:
   outputting at least one of the data elements from the set of one or more data elements for the query or information corresponding to at least one of the data elements from the set of one or more data elements for the query.

17. The system of claim 15 wherein the search on the final graph is a greedy search.

18. The system of claim 15 wherein the step of constructing a proximity graph of the transformed dataset using $\ell^2$ distance, in which at least some of the data elements of the transformed dataset are vertices in the proximity graph and connections between vertices in the proximity graph are edges comprises:

initializing the proximity graph using at least some of the transformed data elements as vertices;
   while not all of the transformed data element been processed, performing step comprising:
      selecting a transformed data element that is not currently a vertex in the proximity graph;
      using a greedy search and $\ell^2$ distance as a measure to identify a set of candidate neighbors;
      selecting from the set of candidate neighbors a set of closest neighbors based upon $\ell^2$ distance;
      adding edges to the proximity graph from the selected transformed element to each neighbor in the set of closest neighbors; and
      for each neighbor in the set of closest neighbors, updating the set of its closest neighbors; and
   outputting the proximity graph comprising transformed data elements.

19. The system of claim 18 wherein the non-transitory computer-readable medium or media further comprises one or more sequences of instructions which, when executed by at least one processor, causes steps to be performed comprising:

outputting a set of neighbors of the origin element comprising transformed data elements;

replacing the transformed data elements in the set of neighbors with corresponding original data elements to form a set of enter data elements; and outputting the set of enter data elements.

20. The system of claim 19 wherein the non-transitory computer-readable medium or media further comprises one or more sequences of instructions which, when executed by at least one processor, causes steps to be performed comprising:

given a query data element, a set of enter data elements, the final graph comprising vertices and edges, and a number of candidates to return k:

initializing a set of data elements of a priority queue with the set of enter data elements;

marking the vertices of the final graph that are members of the set of enter data elements as checked and marking a remainder of the vertices of the final graph as unchecked;

responsive to a number of data elements in the priority queue being greater than the number of candidates to return, setting the priority queue as the top-k data elements in descending order of inner product measured relative to the query data element;

while there exists a data element in the final graph that is unchecked and the priority queue keeps updating, performing steps comprising:

updating the priority queue as a union of the existing priority queue and an unchecked data element in the final graph that forms an edge in the final graph with a data element that is in the existing priority queue;

marking data elements in the updated priority queue as checked; and responsive to the number of data elements in the priority queue being greater than the number of candidates to return, setting the priority queue as the top-k elements in descending order of inner product measured relative to the query data element; and outputting a final priority queue.

* * * * *